United States Patent
Miyano et al.

(10) Patent No.: US 7,907,591 B2
(45) Date of Patent: Mar. 15, 2011

(54) SYNCHRONIZATION DETECTING CIRCUIT AND MULTIMODE WIRELESS COMMUNICATION APPARATUS

(75) Inventors: Kentaro Miyano, Kanagawa (JP); Katsuaki Abe, Kanagawa (JP); Akihiko Matsuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 702 days.

(21) Appl. No.: 11/995,841

(22) PCT Filed: Jul. 19, 2006

(86) PCT No.: PCT/JP2006/314236
§ 371 (c)(1),
(2), (4) Date: Jan. 16, 2008

(87) PCT Pub. No.: WO2007/010923
PCT Pub. Date: Jan. 25, 2007

(65) Prior Publication Data
US 2009/0103516 A1    Apr. 23, 2009

(30) Foreign Application Priority Data

Jul. 19, 2005  (JP) ................. 2005-208106
Jul. 13, 2006  (JP) ................. 2006-192449

(51) Int. Cl.
*H04J 3/06* (2006.01)
(52) U.S. Cl. .................................................. 370/350
(58) Field of Classification Search ............ 370/350
See application file for complete search history.

(56) References Cited

U.S. PATENT DOCUMENTS

| | | | |
|---|---|---|---|
| 5,877,815 A * | 3/1999 | Tsujimura | 348/515 |
| 6,208,701 B1 * | 3/2001 | Hiramatsu et al. | 375/354 |
| 6,289,064 B1 * | 9/2001 | Hiramatsu et al. | 375/365 |
| 6,456,677 B1 * | 9/2002 | Hiramatsu et al. | 375/354 |
| 6,940,837 B1 * | 9/2005 | Kotake | 370/335 |
| 2005/0237429 A1 * | 10/2005 | Grundmeyer et al. | 348/510 |
| 2008/0159442 A1 * | 7/2008 | Tanabe et al. | 375/324 |
| 2009/0207889 A1 * | 8/2009 | Kobayashi et al. | 375/142 |

FOREIGN PATENT DOCUMENTS

| | | |
|---|---|---|
| JP | 06-037708 A | 2/1994 |
| JP | 09-107583 A | 4/1997 |
| JP | 2003-134569 A | 5/2003 |
| JP | 2004-254326 A | 9/2004 |
| JP | 2005-519562 A | 6/2005 |
| WO | WO 03/077437 A2 | 9/2003 |

OTHER PUBLICATIONS

International Search Report for International Application No. PCT/JP2006/314236 dated Sep. 19, 2006.

* cited by examiner

*Primary Examiner* — Kenny S Lin
(74) *Attorney, Agent, or Firm* — RatnerPrestia

(57) ABSTRACT

Multimode wireless communication apparatus supports plural wireless communication methods and includes synchronization detecting part. Digital signals output from first A/D part and second A/D part are combined by synchronization detecting part. Synchronization detecting part converts sampling frequencies of respective digital signals and performs other processes when combining digital signals. Synchronization detecting part detects synchronization timing for plural wireless communication methods by plurally performing correlation operation corresponding to respective wireless communication methods for digital signals combined, thereby providing a multimode wireless communication apparatus with its size and power consumption reduced.

11 Claims, 21 Drawing Sheets

SYNCHRONIZATION DETECTING CIRCUIT AND MULTIMODE WIRELESS COMMUNICATION APPARATUS

THIS APPLICATION IS A U.S. NATIONAL PHASE APPLICATION OF PCT INTERNATIONAL APPLICATION PCT/JP2006/314236.

TECHNICAL FIELD

The present invention relates to a synchronization detecting circuit and a multimode wireless communication apparatus supporting plural wireless communication methods.

BACKGROUND ART

A multimode wireless communication apparatus supporting plural wireless communication methods is disclosed in such as Japanese Patent Unexamined Publication No. 2003-134569.

As shown in FIG. 21, a conventional multimode wireless communication apparatus has first cellular radio 1701, second cellular radio 1702, and control part 1703. Usually, a multimode wireless communication apparatus, even while communicating by either one of the wireless communication methods of first cellular radio 1701 and second cellular radio 1702, needs to always check whether or not communication by the other wireless communication method is possible, and thus has radios with two different wireless communication methods. This results in increased power consumption by an amount corresponding to the number of radios increased. In order to solve the problem, a conventional multimode wireless communication apparatus reduces its power consumption by control part 1703 controlling on and off of the power to first cellular radio 1701 and second cellular radio 1702.

However, the above-described conventional makeup has plural radios to support plural wireless communication methods while sharing a control part. Accordingly, with conventional makeup, the circuit size grows as the number of radios increases, and thus the power consumption undesirably increases even if the control part controls on and off of the power to the radios.

SUMMARY OF THE INVENTION

The synchronization detecting circuit has a first converting part adjusting the sampling frequency of a receiving signal by a first wireless communication method; a second converting part adjusting the sampling frequency of a receiving signal by a second wireless communication method; an adding part combining digital signals output from the first and second converting parts; a delay part storing the combined signal from the adding part; a first synchronization detecting part detecting synchronization timing for the receiving signal by the first wireless communication method, from the combined signal stored in the delay part; and a second synchronization detecting part detecting synchronization timing for the receiving signal by the second wireless communication method, from the combined signal stored in the delay part.

With the makeup, the delay part can be shared among plural wireless communication systems, thereby reducing the size and power consumption of the synchronization detecting circuit.

Figure 1:
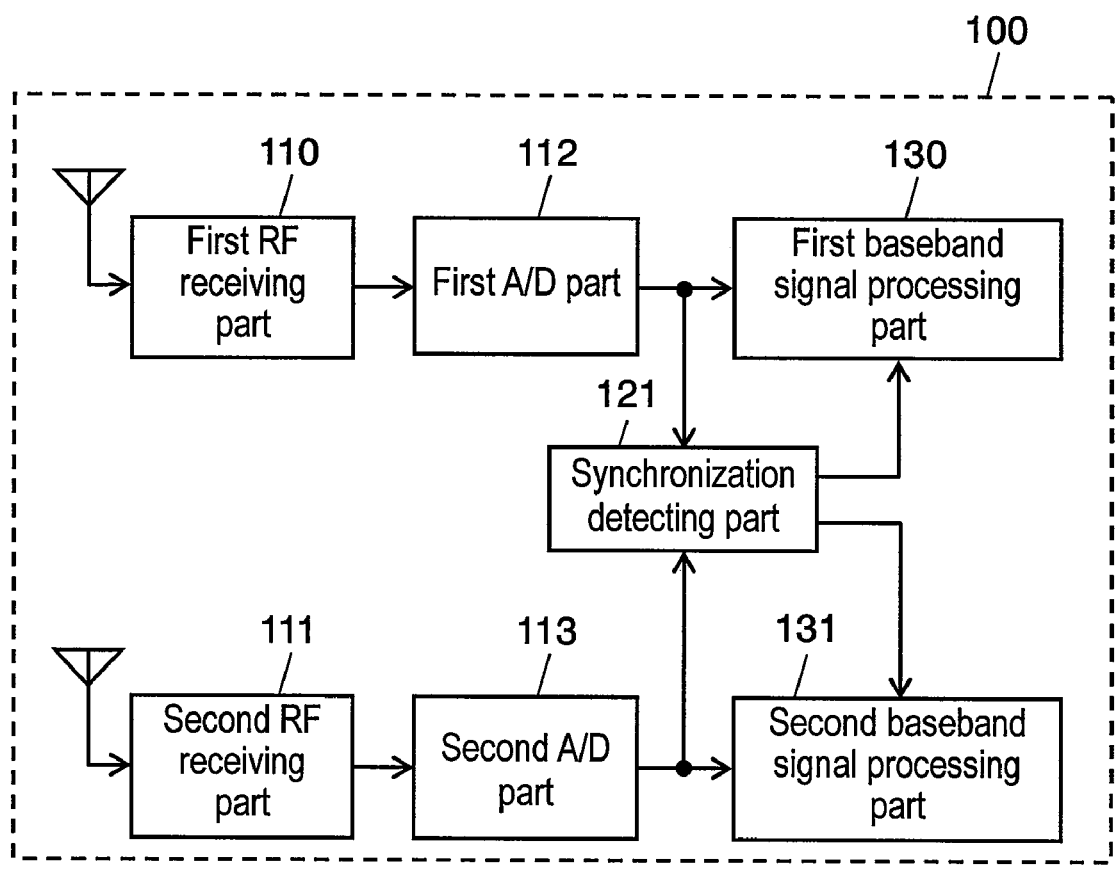
FIG. 1 is a block diagram illustrating makeup of a multimode wireless communication apparatus according to the first exemplary embodiment of the present invention.

REFERENCE MARKS IN THE DRAWINGS 100, 400, 500 Multimode wireless communication apparatus
110 First RF receiving part
111 Second RF receiving part
112 First A/D part
113 Second A/D part
121, 321 Synchronization detecting part
130 First baseband signal processing part
131 Second baseband signal processing part
120, 140, 320, 520 Control part
422, 442 Area judging part
523 Switch
530 Baseband signal processing part (Software signal processing part)
1211 First-wireless-system-use synchronization detecting part (First synchronization detecting part)
1212 Second-wireless-system-use synchronization detecting part (Second synchronization detecting part)
1213 Delay part
1214 Adding part
1215 First rate converting part (First converting part)
1216 Second rate converting part (Second converting part)
1217 First bit-shifting part
1218 Second bit-shifting part
1219 First constant delay part
1220 Second constant delay part
1221 First averaging part
1222 Second averaging part
1230 Weight coefficient adjusting part
12111, 12121 Weight coefficient
12112, 12122, 12114, 12124 Multiplying part
12113, 12123 Adding part
1501, 1502 Switch
1701, 1702 Cellular radio
1703 Control part
2217 Filter
3215 First buffer (First converting part)
3216 Second buffer (Second converting part)
3217 Third buffer (Replica accumulating part)
3218 Switch

DETAILED DESCRIPTION OF PREFERRED EMBODIMENTS

Hereinafter, a description is made for some embodiments of the present invention, using the related drawings.

First Exemplary Embodiment

FIG. 1 is a block diagram illustrating makeup of multimode wireless communication apparatus 100 according to the first exemplary embodiment of the present invention.

In FIG. 1, multimode wireless communication apparatus 100 includes first RF receiving part 110, second RF receiving part 111, first A/D part 112, second A/D part 113, synchronization detecting part 121, first baseband signal processing part 130 as a first signal processing part, and second baseband signal processing part 131 as a second signal processing part.

First RF receiving part 110, first A/D part 112, and first baseband signal processing part 130 process a radio-frequency signal of a first wireless system in a first wireless communication method; and second RF receiving part 111, second A/D part 113, second baseband signal processing part 131 process a radio-frequency signal of a second wireless system in a second wireless communication method.

First RF receiving part 110 converts the radio-frequency signal of the first wireless system, supplied from the antenna, to an intermediate-frequency analog signal, and then outputs it to first A/D part 112. First A/D part 112 converts the analog signal entered to a digital signal, and then outputs it to synchronization detecting part 121 and first baseband signal processing part 130.

Second RF receiving part 111 converts the radio-frequency signal of the second wireless system, supplied from the antenna, to an intermediate-frequency analog signal, and then outputs it to second A/D part 113. Second A/D part 113 converts the analog signal entered to a digital signal, and then outputs it to synchronization detecting part 121 and second baseband signal processing part 131.

When synchronization detecting part 121, connected to first A/D part 112 and second A/D part 113, is supplied with the digital signal of the first wireless system, output from first A/D part 112; and that of the second wireless system, output from second A/D part 113, part 121 detects timing for both signals.

For example, synchronization detecting part 121 has a function for detecting timing of removing a guard interval for OFDM (Orthogonal Frequency Division Multiplexing) as a wireless communication method; a function for detecting timing of a symbol, slot, and frame required for despreading for CDMA (Code Division Multiple Access). Timings for the two wireless communication methods, detected by synchronization detecting part 121 are output to first baseband signal processing part 130 and second baseband signal processing part 131, respectively.

First baseband signal processing part 130 performs digital signal processing such as demodulation for the digital signal supplied from first A/D part 112 on the basis of timing supplied from synchronization detecting part 121. Second baseband signal processing part 131 performs digital signal processing such as demodulation for the digital signal supplied from second A/D part 113 on the basis of timing supplied from synchronization detecting part 121.

In the first embodiment, a description is made for the case where the first wireless system uses IEEE 802.11a as the first wireless communication method; and the second wireless system, W-CDMA (Wideband-Code Division Multiple Access) as the second wireless communication method.

Synchronization detecting part 121 detects timing for synchronization with a preamble signal for IEEE 802.11a; and with a spread code for W-CDMA. The sampling rate corresponding to the basic sampling frequency in IEEE 802.11a is 20 M samples/second, and the chip rate corresponding to the basic sampling frequency in W-CDMA is 3.84 M chips/second, and thus sampling frequencies of digital signals fed into synchronization detecting part 121 are different between the case where multimode wireless communication apparatus 100 is communicating by IEEE 802.11a and that by W-CDMA.

Figure 2:
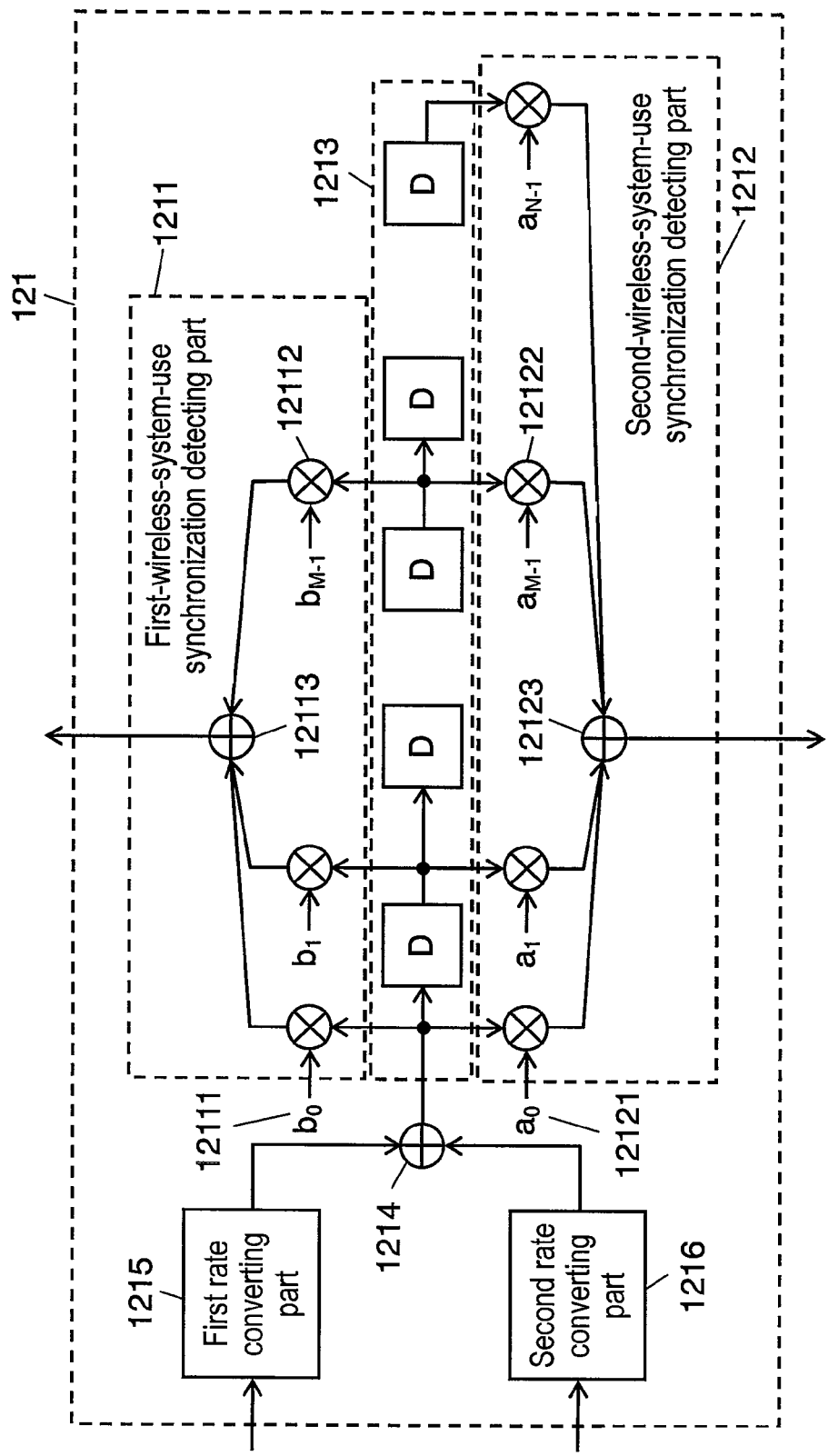
FIG. 2 is a block diagram illustrating makeup of a synchronization detecting part detecting synchronization timing by cross-correlation operation, of the multimode wireless communication apparatus according to the first embodiment of the present invention.

FIG. 2 is a block diagram illustrating makeup of synchronization detecting part 121 detecting synchronization timing by cross-correlation operation, of multimode wireless communication apparatus 100 according to the first embodiment. Synchronization detecting part 121 includes first rate converting part 1215 as a first converting part that converts the sampling frequency of a receiving signal received by the first wireless communication method and outputs the digital signal; second rate converting part 1216 as a second converting part that converts the sampling frequency of a receiving signal received by the second wireless communication method and outputs the digital signal; adding part 1214 that combines digital signals with their sampling frequencies converted from receiving signals by first rate converting part 1215 and second rate converting part 1216; delay part 1213 composed of plural delay elements cascaded (shown by "D" in the figure) that stores and delays combined signals supplied from adding part 1214; first-wireless-system-use synchronization detecting part 1211 as a first synchronization detecting part that detects synchronization timing for the receiving signal by the first wireless communication method, from the combined signal stored and delayed by delay part 1213; and second-wireless-system-use synchronization detecting part 1212 as a second synchronization detecting part that detects synchronization timing for the receiving signal by the second wireless communication method, from the combined signal stored and delayed by delay part 1213. Here, delay parts 1213 composed of plural delay elements shown by "D" in the figure are cascaded with each other. Because there are a large number, only some of them are shown for simplicity. In the drawings hereinafter, delay parts 1213 are indicated in the same way.

First-wireless-system-use synchronization detecting part 1211 includes multiplying part 12112 composed of plural multipliers, and adding part 12113. Multiplying part 12112 multiplies weight coefficient 12111 (indicated as $b_0, b_1, \ldots, b_{M-1}$ (M is a positive integer) in the figure), by plural digital signals stored in delay part 1213 and additionally corresponding to weight coefficient 12111, and then outputs the products to adding part 12113. The sum calculated by adding part 12113 is output to first baseband signal processing part 130. Part 1211 performs such correlation operation for detecting synchronization timing for the first wireless system. Here, if the first wireless system uses IEEE 802.11a, weight coefficient 12111 uses the preamble signal in IEEE 802.11a.

Second-wireless-system-use synchronization detecting part 1212 includes multiplying part 12122 composed of plural multipliers, and adding part 12123. Multiplying part 12122 multiplies weight coefficient 12121 (indicated as $a_0, a_1, \ldots, a_{M-1}, \ldots, a_{N-1}$ (M, N are positive integers) in the figure), by the plural digital signals stored in delay part 1213 and additionally corresponding to weight coefficient 12121, and then outputs these products to adding part 12123. The sum calculated by adding part 12123 is output to second baseband signal processing part 131. Part 1212 performs such correlation operation for detecting synchronization timing for the second wireless system. Here, if the second wireless system uses W-CDMA, weight coefficient 12121 uses the spreading code in W-CDMA. Weight coefficients 12111, 12121 can be preliminarily prepared as tap coefficients or can be read from such as a memory.

In the first exemplary embodiment, the first wireless system uses IEEE 802.11a and the second wireless system uses W-CDMA, thus first rate converting part 1215 and second rate converting part 1216 output a sampling frequency being oversampled to the same sampling frequency (i.e. 480 MHz), which is the minimum from among integral multiples of sample rates or chip rates in both methods, to adding part 1214. That is, first rate converting part 1215 oversamples the digital signal in IEEE 802.11a entered by 24 times and outputs it; second rate converting part 1216 oversamples the digital signal in W-CDMA entered by 125 times and outputs it.

Adding part 1214 combines these two digital signals and outputs the results to delay part 1213. In the makeup as shown in FIG. 2, synchronization detecting part 121 performs correlation operation for all the samples of combined signals. That is, delay part 1213 is supplied with the oversampled digital signals in each wireless communication method. Then, first-wireless-system-use synchronization detecting part 1211 uses the preamble signal in IEEE 802.11a oversampled by 24 times with weight coefficient 12111. Meanwhile, second-wireless-system-use synchronization detecting part 1212 uses the spreading code in W-CDMA oversampled by 125 times with weight coefficient 12121.

At this moment, weight coefficient 12111 remains the same value 24 (corresponding to the oversampling number) times continuously, and thus $b_0$ through $b_{23}$, $b_{24}$ through $b_{47}, \ldots, b_{24 \times K}$ through $b_{24 \times (K+1)-1}$ (K is a positive integer) are all the same, and weight coefficient 12121 remains the same value 125 (corresponding to the oversampling number) times continuously, and thus $a_0$ through $a_{124}$, $a_{125}$ through $a_{249}, \ldots, a_{125 \times L}$ through $a_{125 \times (L+1)-1}$ (L is a positive integer) are all the same as well. For example, if the preamble signal in IEEE 802.11a consists of 320 samples, and the spreading code in W-CDMA consists of 256 chips, 7,680 (=320×24) pieces of weight coefficients 12111 and multiplying parts 12112, and 32,000 (=256×125) pieces of weight coefficients 12121 and multiplying parts 12122 are required. For delay part 1213, 32,000 pieces, which is the larger one out of the required numbers of weight coefficients and multiplying parts in the two methods, of delay elements are required.

Figure 3:
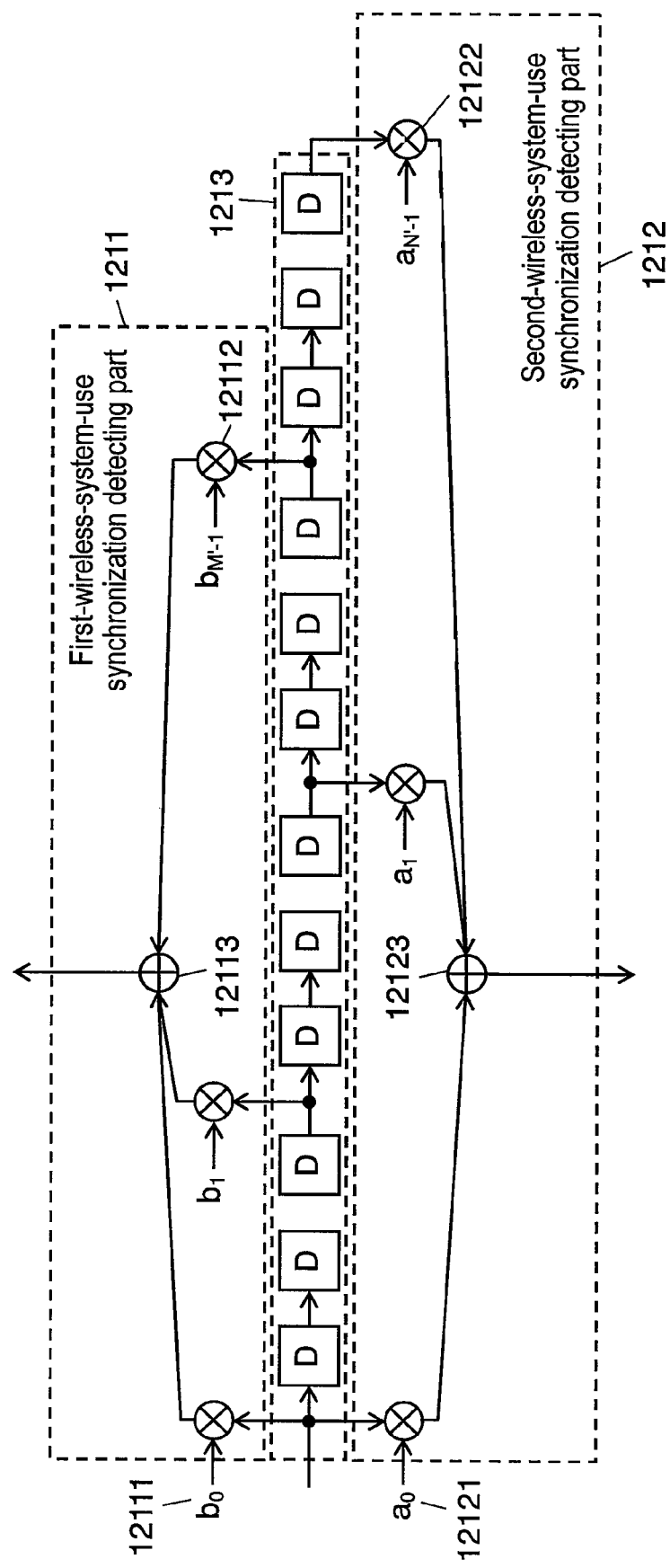
FIG. 3 is a block diagram illustrating another makeup of the synchronization detecting part detecting synchronization timing by cross-correlation operation, of the multimode wireless communication apparatus according to the first embodiment of the present invention.

First-wireless-system-use synchronization detecting part 1211 and second-wireless-system-use synchronization detecting part 1212 can be configured as shown in FIG. 3 as well. FIG. 3 is a block diagram illustrating another makeup of synchronization detecting part 121 detecting synchronization timing by cross-correlation operation, of multimode wireless communication apparatus 100 according to the first embodiment.

Next, a description is made for the differences of first-wireless-system-use synchronization detecting part 1211 and second-wireless-system-use synchronization detecting part 1212 in FIG. 3 from those in FIG. 2.

In FIG. 2, second-wireless-system-use synchronization detecting part 1212 is supplied in parallel with signals without delay output from adding part 1214 and with signals output from all the delay elements of delay part 1213. First-wireless-system-use synchronization detecting part 1211 is supplied in parallel with signals without delay output from adding part 1214 and with signals output not from all the plural delay elements of delay part 1213, but from delay elements continuously cascaded up to a required stage number.

In FIG. 3, on the other hand, second-wireless-system-use synchronization detecting part 1212 is supplied directly with the signal without delay output from adding part 1214 to delay part 1213, which is the same as in FIG. 2. However, part 1212 is supplied in parallel not with signals output from all the delay elements of delay part 1213, but with signals output from delay elements with discontinuous stage numbers (i.e. skipping a given number of delay elements).

First-wireless-system-use synchronization detecting part 1211 is supplied directly with the signal without delay output from adding part 1214 to delay part 1213, which is the same as in FIG. 2. However, part 1211 is supplied in parallel not with signals output from all the delay elements of delay part 1213, but with signals output from delay elements with discontinuous stage numbers (i.e. skipping a given number (generally different from that in second-wireless-system-use synchronization detecting part 1212) of delay elements out of those continuously cascaded up to a required stage number). Accordingly, weight coefficients 12111 and 12121 are indicated as $b_0, b_1, \ldots, b_{M'-1}$ and $a_0, a_1, \ldots, a_{N'-1}$ (M', N' are positive integers) in the figure, respectively.

If synchronization detecting parts 1211 and 1212 in each wireless system are composed as shown in FIG. 3, synchronization detecting part 121 does not perform correlation operation for all the samples, but only for samples required for detecting synchronization timing. This enables reducing the numbers of weight coefficients 12111, weight coefficients 12121, multiplying parts 12112, and multiplying parts 12122, compared to the composition shown in FIG. 2. For example, if the preamble signal in IEEE 802.11a consists of 320 samples, and the spreading code in W-CDMA consists of 256 chips, 32,000 pieces of delay parts 1213 are required in the same way as in FIG. 2. However, weight coefficients 12111 and multiplying parts 12112 need to be arranged only by 320 pieces in total at every 24 pieces of delay elements of delay part 1213. In the same way, weight coefficients 12121 and multiplying parts 12122 need to be arranged by 256 pieces in total at every 125 pieces of delay elements of delay part 1213.

Figure 4:
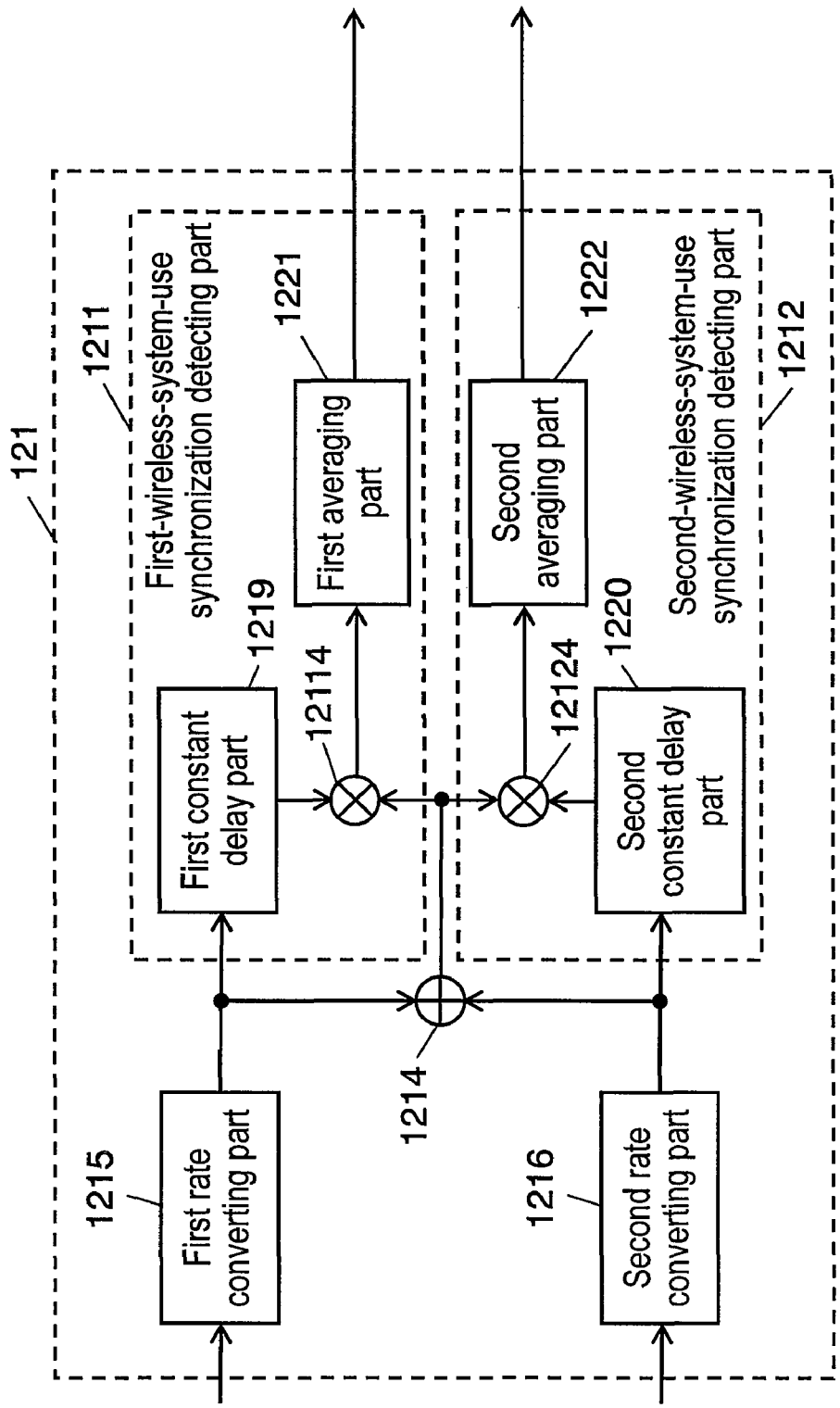
FIG. 4 is a block diagram illustrating makeup of a synchronization detecting part detecting synchronization timing by auto-correlation operation, of the multimode wireless communication apparatus according to the first embodiment of the present invention.

FIGS. 2 and 3 illustrate makeup for performing cross-correlation operation for detecting synchronization timing. However, makeup for performing auto-correlation operation as shown in FIG. 4 is also possible. FIG. 4 is a block diagram illustrating makeup of synchronization detecting part 121 detecting synchronization timing by auto-correlation operation, of multimode wireless communication apparatus 100 according to the first embodiment. The makeup shown in FIG. 4 is different from that in FIGS. 2 and 3 in that multiplying parts 12114, 12124 multiply the digital signals delayed by a certain period by first constant delay part 1219 and second constant delay part 1220, by the digital signals combined by adding part 1214, respectively, to perform correlation (inner product) operation. Here, "a certain period" represents time corresponding to the repetition cycle of a known signal for each wireless system used for correlation detection in each synchronization detecting part, where generally each period is different from the other. Another difference is that first averaging part 1221 and second averaging part 1222 are provided that perform averaging process over a given period after correlation (inner product) operation. "A given period" during which averaging process is performed represents time corresponding to the repetition cycle of a known signal for each wireless system used for correlation detection in each synchronization detecting part, where generally each period is different from the other.

In FIG. 4, first constant delay part 1219 delays the digital signal supplied from first rate converting part 1215 by a certain period predetermined and then outputs it. Second constant delay part 1220 delays the digital signal supplied from second rate converting part 1216 by a certain period predetermined and then outputs it. In the first embodiment, the first wireless system uses IEEE 802.11a and the second wireless system uses W-CDMA, thus periods delayed by first constant delay part 1219 and second constant delay part 1220 are predetermined. For example, if the preamble signal in IEEE 802.11a consists of 320 samples, and the spreading code in W-CDMA consists of 256 chips, first constant delay part 1219 delays by the equivalent of 7,680 samples; and second constant delay part 1220, by the equivalent of 32,000 chips.

After multiplying part 12114 multiplies a digital signal delayed by a certain period by first constant delay part 1219, by the digital signal output from adding part 1214, first averaging part 1221 performs averaging process over a certain period, and accordingly first-wireless-system-use synchronization detecting part 1211 performs auto-correlation operation for detecting synchronization timing for the first wireless system.

Meanwhile, after multiplying part 12124 multiplies a digital signal delayed by a certain period by first constant delay part 1220, by the digital signal output from adding part 1214, second averaging part 1222 performs averaging process over a certain period, and accordingly second-wireless-system-use synchronization detecting part 1212 performs auto-correlation operation for detecting synchronization timing for the second wireless system. Although the makeup as shown in FIG. 4 is lower in the accuracy of detecting synchronization timing than that in FIGS. 2 and 3, the number of multiplying parts can be reduced, thereby contracting the circuit scale of synchronization detecting part 121. In FIG. 4, the output from multiplying part 12114 and multiplying part 12124 needs to undergo averaging process over a given section as described above. However, each output may undergo averaging process internally after it is fed into first baseband signal processing part 130 or second baseband signal processing part 131 in FIG. 1, where these two averaging parts 1221 and 1222 may be dispensed with.

Figure 5:
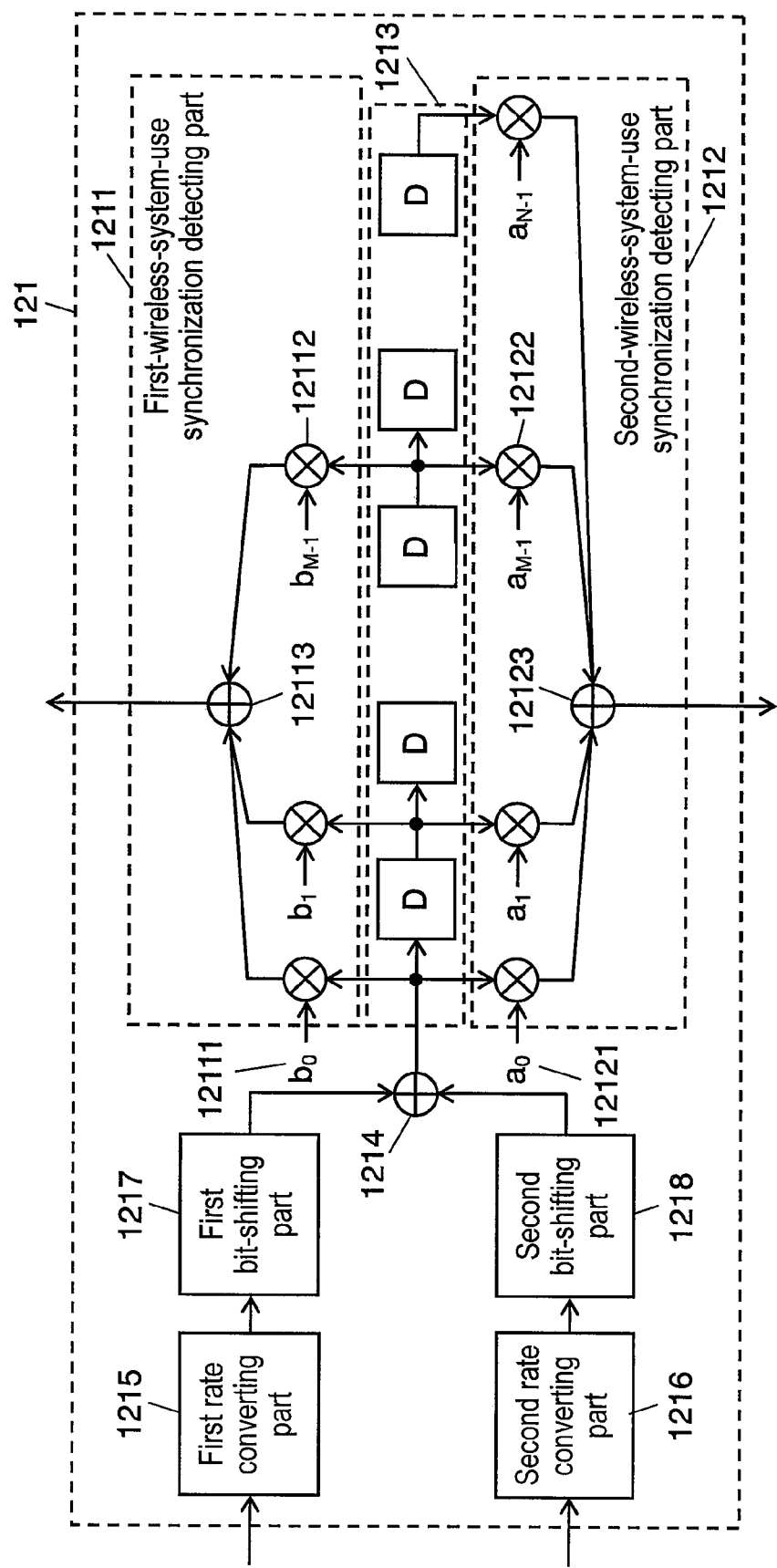
FIG. 5 is a block diagram illustrating makeup of a synchronization detecting part including a bit-shifting rate converting part, of the multimode wireless communication apparatus according to the first embodiment of the present invention.

FIG. 5 is a block diagram illustrating makeup of synchronization detecting part 121 having a bit-shifting rate converting part, of multimode wireless communication apparatus 100 according to the first embodiment. FIG. 5 illustrates the makeup shown in FIG. 2 further having first bit-shifting part 1217 and second bit-shifting part 1218. Parts 1217 and 1218 bit-shift the digital signal entered and then output it. For example, if the digital signal in the first wireless system has a bit width for 32-bit operation; and the second, 16-bit, second bit-shifting part 1218 bit-shifts the digital signal by 16 bits, and accordingly adding part 1214, multiplying part 12112, and multiplying part 12122 can operate in 32 bits. Thus, synchronization detecting part 121 further has first bit-shifting part 1217 and second bit-shifting part 1218 as a bit-shifting part that matches the number of bits for operation by first-wireless-system-use synchronization detecting part 1211 as the first synchronization detecting part and second-wireless-system-use synchronization detecting part 1212 as the second synchronization detecting part.

This makeup allows synchronization detecting part 121 to detect synchronization timing accurately even if the digital signals in the first and second wireless systems are different in their bit width, where weight coefficients 12111 and 12121 need to be prepared preliminarily.

As described above, synchronization detecting part 121 of multimode wireless communication apparatus 100 according to the first embodiment, with adding part 1214 shown in FIGS. 2 through 5, combines the digital signals in the first and second wireless systems and simultaneously detects synchronization timing for the two wireless systems. If combining the digital signals in this way, although the digital signals in each wireless system become noise components for the other, synchronization timing can be detected because known signals in a wireless system, such as the preamble signal and the spreading code for synchronization detection, generally has a low correlation with receiving signals in another wireless system.

Under the circumstances, multimode wireless communication apparatus 100, further having an RF receiving part, A/D part, and baseband signal processing part of a wireless system different from the first and second wireless systems, combines the digital signals in three or more wireless communication methods, and accordingly can detect synchronization for each wireless communication system as well. Alternatively, when a wireless system has spare time in a resting state such as in communication idle time (e.g. standby), synchronization timing may be detected for the first and second wireless systems by time division.

Figure 6:
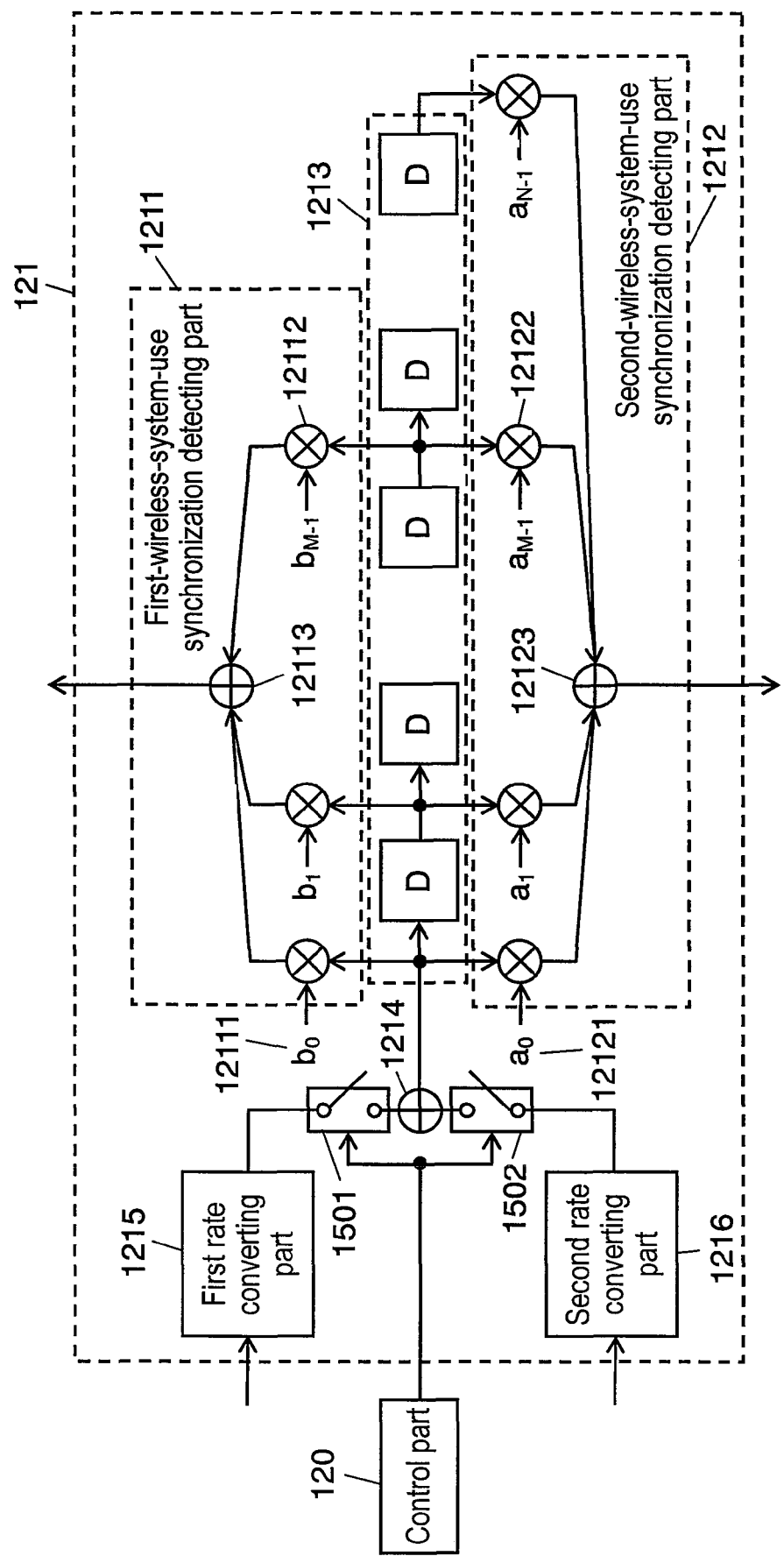
FIG. 6 is a block diagram illustrating makeup of a synchronization detecting part including a time-division rate converting part, of the multimode wireless communication apparatus according to the first embodiment of the present invention.

FIG. 6 is a block diagram illustrating makeup of synchronization detecting part 121 having a time-division rate converting part, of multimode wireless communication apparatus 100 according to the first embodiment. FIG. 6 is different from FIG. 2 in that control part 120 is provided that controls whether or not synchronization timing is to be detected simultaneously, and switches 1501 and 1502 are further provided that switch the input from first rate converting part 1215 as the first converting part and second rate converting part 1216 as the second converting part, to adding part 1214. While the first or second wireless communication method performing communication is in a resting state, controlling switch 1501 and switch 1502 allows detecting synchronization timing in the first or second wireless communication method in a resting state, by time division. In addition, with switches 1501 and 1502 controlled by control part 120, the output from first rate converting part 1215 and second rate converting part 1216 can be combined and output simultaneously, or can be output separately to delay part 1213 by time division. Thus, outputting by time division enables detecting synchronization timing further highly accurately because while a wireless system is not communicating, a noise component does not occur in the other wireless system.

Figure 7:
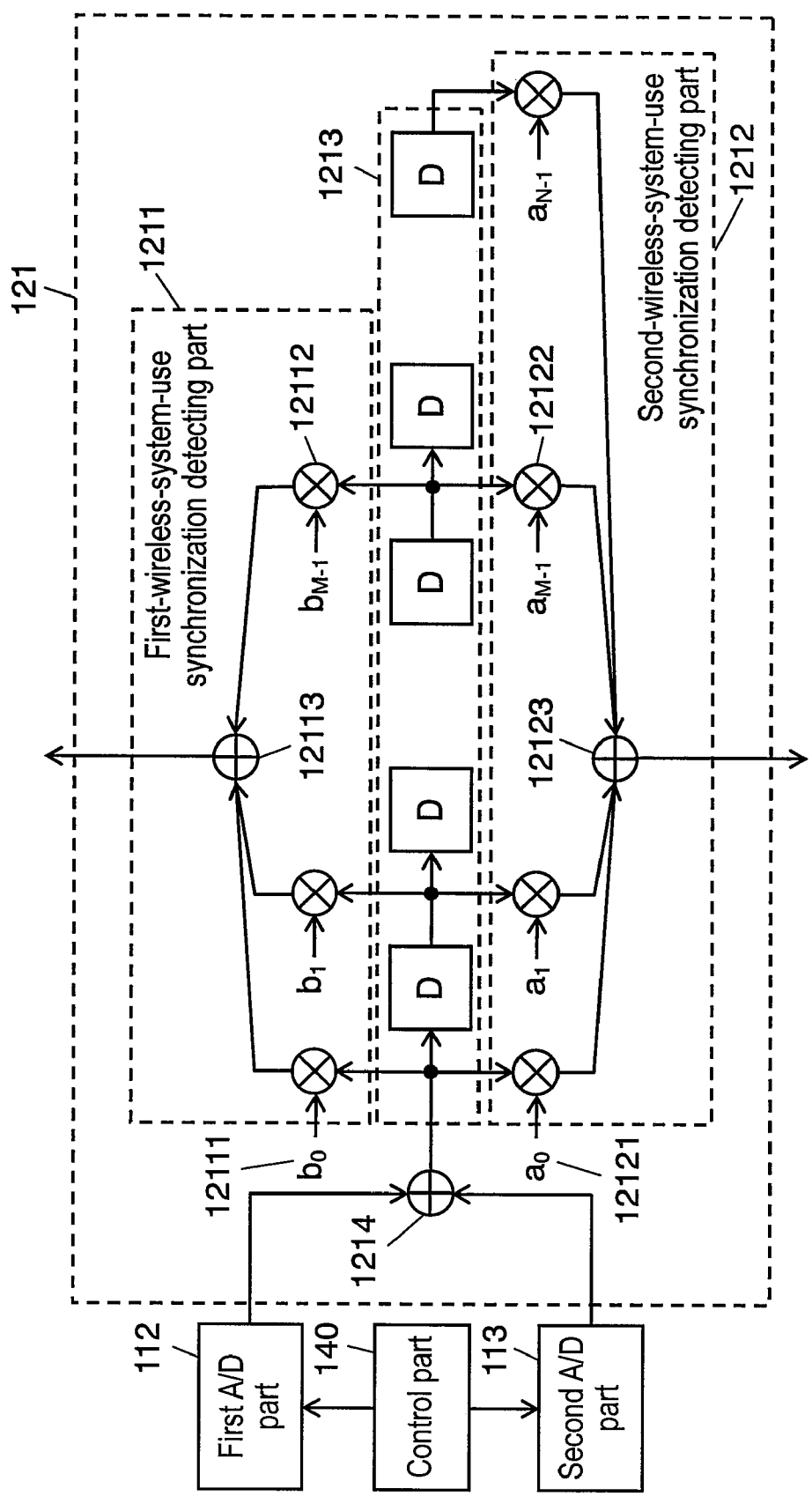
FIG. 7 is a block diagram illustrating makeup of a synchronization detecting part including an A/D part-directly-controlling rate converting part, of the multimode wireless communication apparatus according to the first embodiment of the present invention.

Furthermore, control part 140 can be provided that controls a sampling frequency of the digital signals output from first A/D part 112 and second part A/D 113 as shown in FIG. 7. FIG. 7 is a block diagram illustrating makeup of synchronization detecting part 121 having an A/D part-directly-controlling rate converting part, of multimode wireless communication apparatus 100 according to the first embodiment. FIG. 7 is different from FIG. 2 in that first rate converting part 1215 and second rate converting part 1216 that are required in synchronization detecting part 121 shown in FIG. 2 are dispensed with because control part 140 directly controls first A/D part 112 and second A/D part 113 to convert the sampling frequency instead of arranging each rate converting part to control the sampling frequency for the digital signals output from each A/D part.

In the first exemplary embodiment, the first and second wireless systems use IEEE 802.11a and W-CDMA, but not limited to. The sampling rate and chip rate in the two wireless communication methods are not particularly limited. The rate converting part can use zero insertion, interpolation filter, linear interpolation, zero-order hold, and others. In FIGS. 5, 6, and 7, correlation operation is performed for all the samples in the same way as in FIG. 2. However, correlation operation can be performed only for samples required for detecting synchronization timing in the same way as in FIG. 3, or auto correlation can be performed in the same way as in FIG. 4.

As described above, multimode wireless communication apparatus 100 according to the first embodiment is characterized in that detection of synchronization timing performed by first-wireless-system-use synchronization detecting part 1211 as the first synchronization detecting part and second-wireless-system-use synchronization detecting part 1212 as the second synchronization detecting part is executed on the basis of the result of correlation operation between a specific code preliminarily prescribed for the first or second wireless communication method, namely a weight coefficient; and the combined signal of the digital signals stored in delay part 1213, according to a sampling frequency. Thus, synchronization timing can be detected even for the combined signal by both wireless communication methods.

As described above, according to the present invention, a delay part for detecting synchronization timing can be shared among plural wireless communication systems, thereby contracting the circuit scale of a multimode wireless communication apparatus according to the present invention along with reducing the power consumption.

Second Exemplary Embodiment

In the first embodiment, the sampling frequency is set to the same one that is the minimum from among integral multiples of sampling rates or chip rates in different wireless communication methods. In the second embodiment, the sampling frequency is set to an integral multiple of the larger one out of sampling rates or chip rates in the first and second wireless systems. In the second embodiment, the first wireless system is assumed to use IEEE 802.11a; and the second, W-CDMA as well as in the first embodiment. For example, the sampling frequency is assumed to be 80 MHz, which is 4 times a sampling rate of 20 M samples/second in IEEE 802.11a of the first wireless system with the larger sampling rate.

Figure 8:
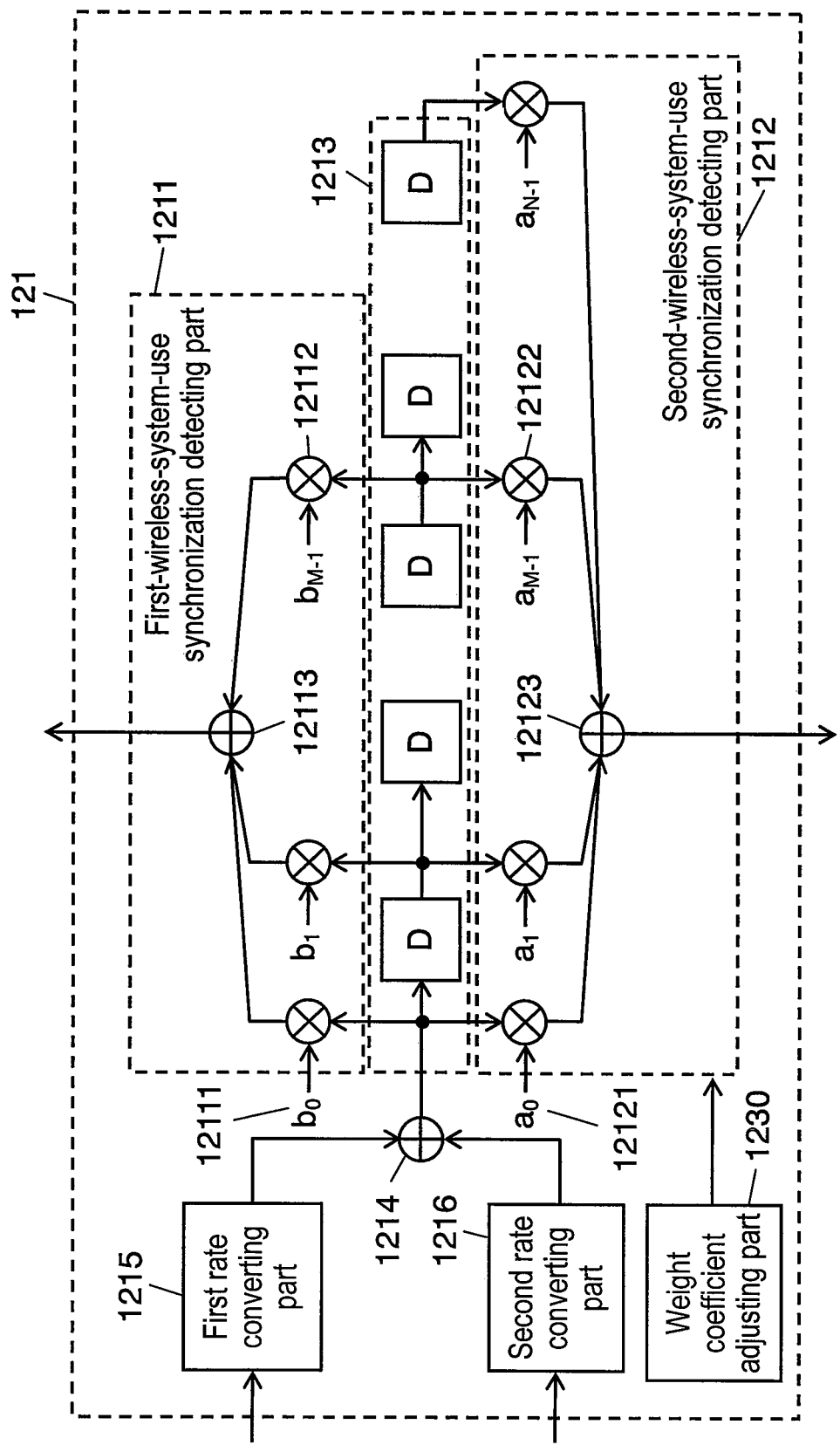
FIG. 8 is a block diagram illustrating makeup of a multimode wireless communication apparatus according to the second exemplary embodiment of the present invention.

FIG. 8 is a block diagram illustrating makeup of synchronization detecting part 121 of multimode wireless communication apparatus 100 according to the second embodiment of the present invention. In FIG. 8, the second embodiment is different from the first in that synchronization detecting part 121 has weight coefficient adjusting part 1230.

Weight coefficient adjusting part 1230 adjusts the repetition number of a weight coefficient to adjust a fraction if the sampling frequency is not an integral multiple of the own sampling rate. Concretely, weight coefficient 12111 uses a signal oversampled by 4 times the preamble signal in IEEE 802.11a, and weight coefficient 12121 uses a signal oversampled by approximately 21 ($\approx 80/3.84$) times the spreading code in W-CDMA.

That is, each element of weight coefficient 12111 remains the same value 4 times continuously in ascending order of element numbers, and thus $b_0$ through $b_3$, $b_4$ through $b_7$, ..., $b_{4 \times K}$ through $b_{4 \times (k+1)-1}$ (K is a positive integer) are the same value. Meanwhile, each element of weight coefficient 12121 remains the same 20 times or 21 times continuously in ascending order of element numbers because the oversampling rate 80/3.84 is not an integer. That is, $a_0$ through $a_{19}$, $a_{20}$ through $a_{40}$, $a_{41}$ through $a_{61}$, ..., $a_X$ through $a_{X+19}$, $a_{X+20}$ through $a_{X+40}$, ..., $a_Y$ through $a_{Y+20}$ (X, Y are positive integers) are the same value. Weight coefficient adjusting part 1230 manages this repetition number so that the weight coefficient of the second system will be adjusted to the same value 80/3.84 times continuously on average. For example, if the preamble signal in IEEE 802.11a consists of 320 samples, and the spreading code in W-CDMA consists of 256 chips, 1,280 (=320×4) pieces of weight coefficients 12111 and multiplying parts 12112 are required, and 5,333 ($\approx 256 \times 80/3.84$) pieces of weight coefficients 12121 and multiplying parts 12122 are required. For delay parts 1213, 5,333 pieces, the larger one, are required.

Figure 9:
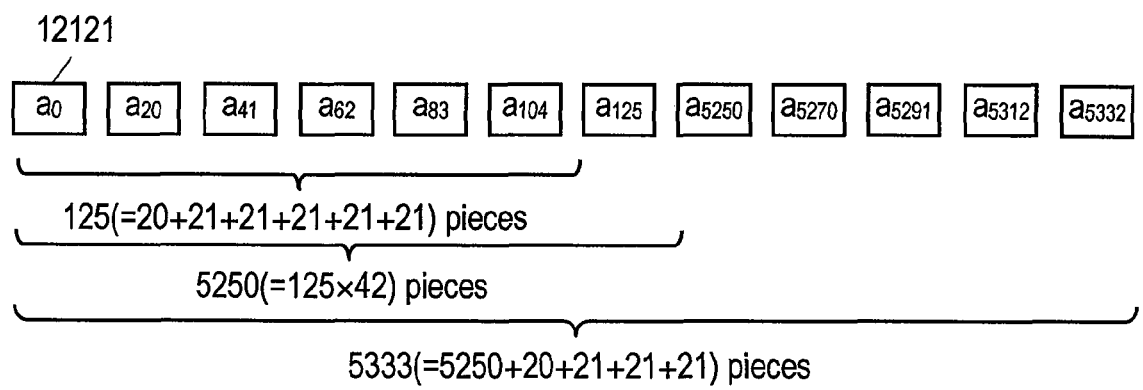
FIG. 9 illustrates makeup of a weight coefficient in the multimode wireless communication apparatus according to the second embodiment of the present invention.

FIG. 9 illustrates circumstances of repeating of weight coefficient 12121 in this case. The number of weight coefficients required for 6 chips, for example, is calculated to obtain a round figure as 6×80/3.84=125. Meanwhile, 256=6×42+4, and thus from 125 (i.e. the equivalent of 6 chips) and 83 (i.e. the equivalent of remaining 4 chips), a calculation can be made as 5,333=125×42+83, 125=(20+21+21+21+21+21), and 83=(20+21+21+21). That is, 5,250 (=125×42) pieces out of all the weight coefficients represent 252 (=6×42) chips of the spreading codes, and 83 pieces of remaining weight coefficients represent 4 chips of the spreading codes, to represent 256 chips of the spreading codes.

As described above, if the number corresponding to the number of samples per one chip is 20 or 21, how 20 samples/chip or 21 samples/chip are arranged does not particularly matter. The above description is only an example and not limited.

First-wireless-system-use synchronization detecting part 1211 and second-wireless-system-use synchronization detecting part 1212 can have the same makeup as in FIG. 3 of the first exemplary embodiment. In this case, correlation operation is not performed for all the samples, but for samples required for detecting synchronization timing in the same way as in the first embodiment. This allows reducing the numbers of weight coefficients 12111, weight coefficients 12121, multiplying parts 12112, and multiplying parts 12122. For example, if the preamble signal in IEEE 802.11a consists of 320 samples, and the spreading code in W-CDMA consists of 256 chips, 5,333 pieces of delay parts 1213 are required in the same way as in FIG. 8. However, weight coefficients 12111 and multiplying parts 12112 need to be arranged only by 320 pieces at every 4 pieces of delay parts 1213. In the same way, weight coefficients 12121 and multiplying parts 12122 need to be arranged only by 256 pieces at every 20 or 21 pieces of delay parts 1213.

Figure 10:
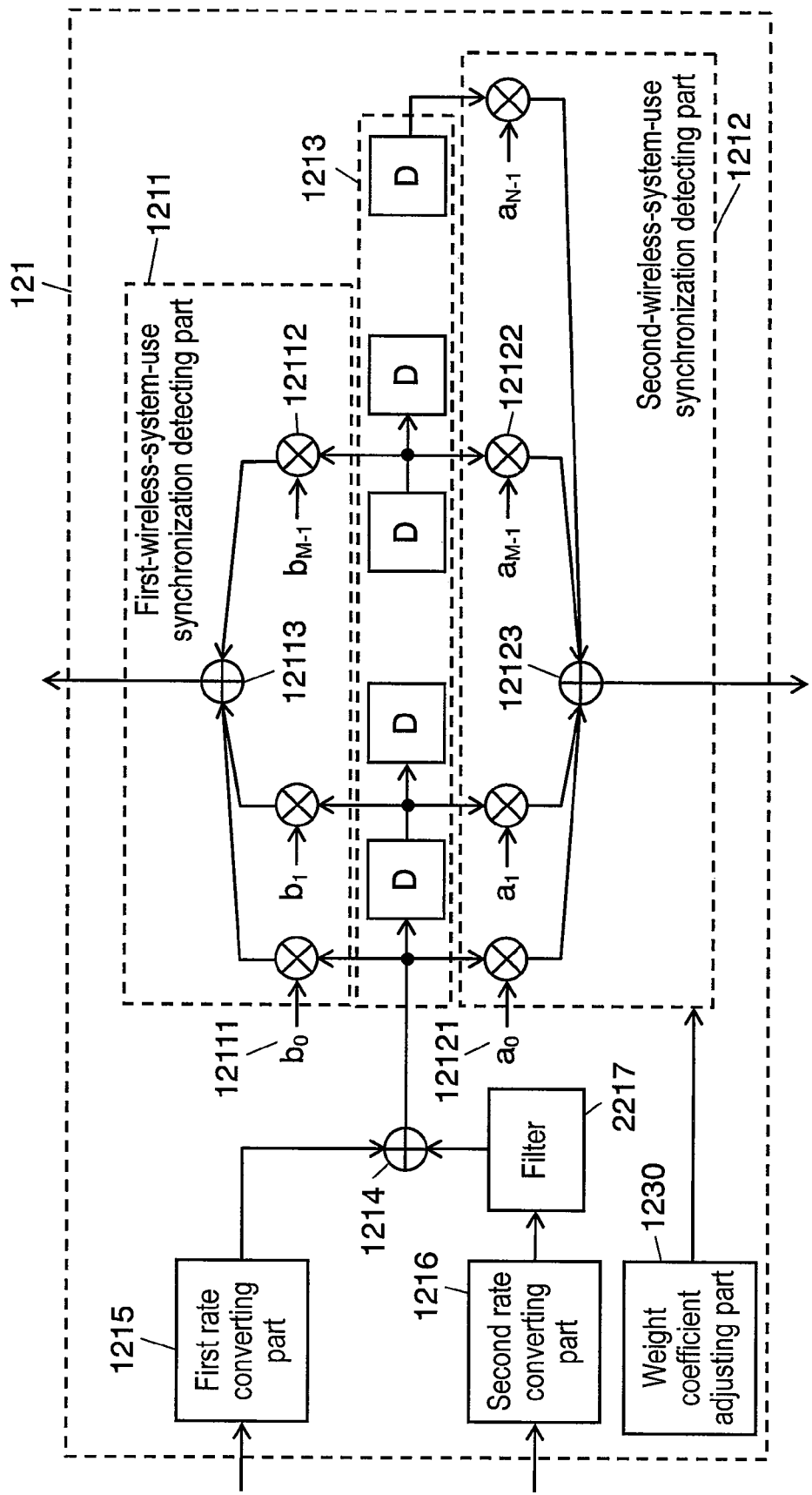
FIG. 10 is a block diagram illustrating another makeup of the multimode wireless communication apparatus according to the second embodiment of the present invention.

Furthermore, in the second embodiment, the sampling frequency of second A/D part 113 (not shown in FIG. 8) and that of second rate converting part 1216 are not in a relationship of integral multiple, thus generating an unnecessary frequency component in the output from second rate converting part 1216. Accordingly, as shown in FIG. 10, filter 2217 may be inserted between second rate converting part 1216 and adding part 1214 to remove an unnecessary frequency component in the output from second rate converting part 1216. FIG. 10 is a block diagram illustrating another makeup of synchronization detecting part 121 of multimode wireless communication apparatus 100 according to the second embodiment. With this makeup, correlation operation is possible with the influence of an unnecessary frequency component reduced. In order to remove an unnecessary frequency component, the first and second rate converting parts can be made of a combination of an interpolation filter and decimation filter.

In this embodiment, the first and second wireless systems use IEEE 802.11a and W-CDMA, but not limited to, and makeup of the rate converting part does not particularly matter. The rate converting part may be bit-shifting, with a function of bit-shifting the digital signals as shown in FIG. 5; time-division, with a function of switching the input to the adding part as shown in FIG. 6; or A/D part-directly-controlling, with a function of controlling the sampling frequency of the digital signals as shown in FIG. 7.

Figure 11:
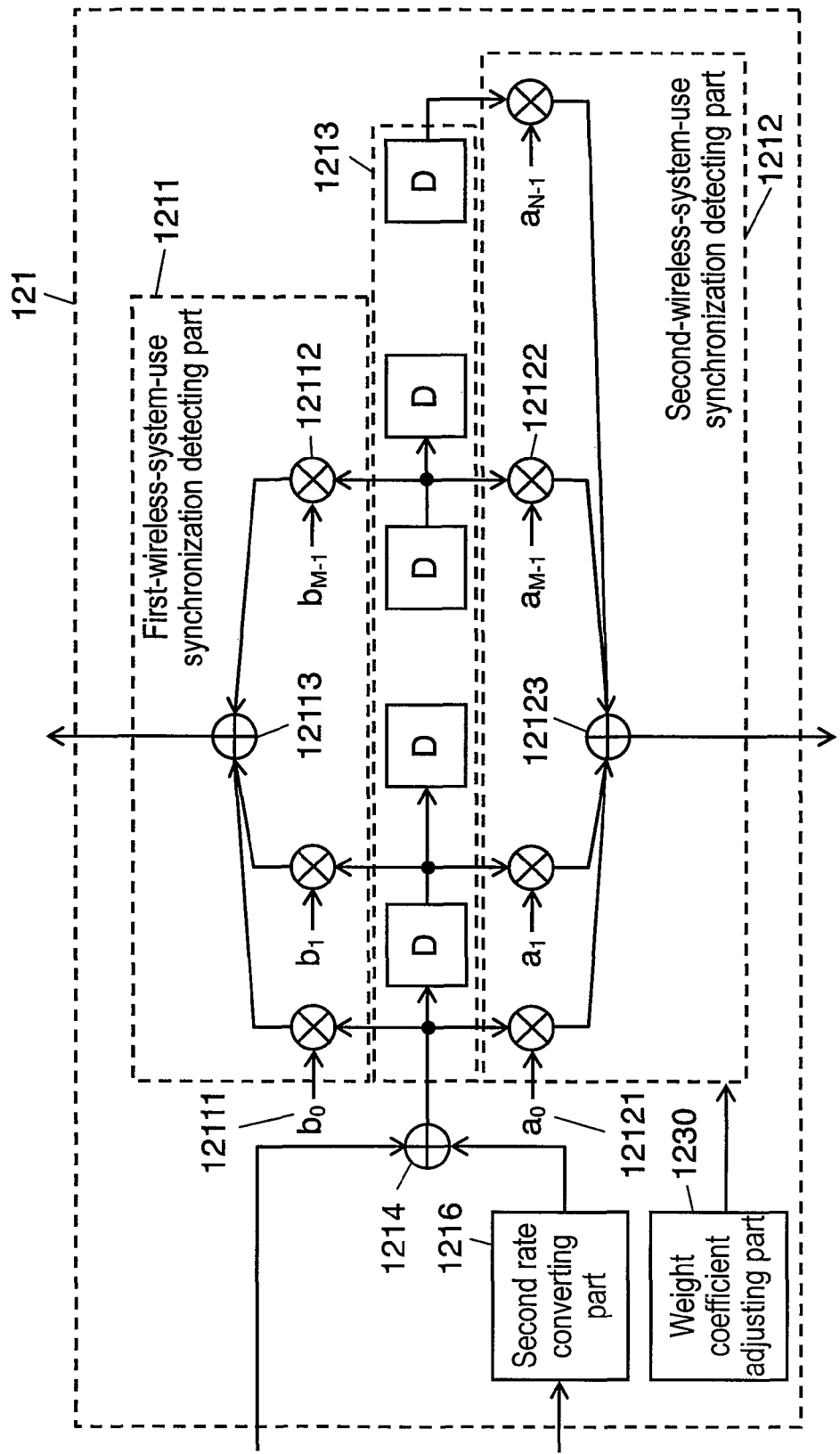
FIG. 11 a block diagram illustrating still another makeup of the multimode wireless communication apparatus according to the second embodiment of the present invention.

In addition, the sampling frequency is not set to an integral multiple of the largest sampling rate or chip rate, out of those in plural wireless systems, but may be set to an integral multiple of a sampling rate or chip rate other than the largest one and additionally larger than the largest sampling rate or chip rate. Alternatively, the largest sampling rate or chip rate may be directly the sampling frequency, where first rate converting part 1215 can be omitted as shown in FIG. 11.

For example, if the preamble signal in IEEE 802.11a consists of 320 samples, and the spreading code in W-CDMA consists of 256 chips, 320 pieces of weight coefficients 12111 and multiplying parts 12112 are required, and 1,333 ($\approx$256×20/3.84) pieces of weight coefficients 12121 and multiplying parts 12122 are required. For delay parts 1213, 1,333 pieces, the larger one, are required. Weight coefficient 12121 in this case is represented in the same way as in FIG. 9. That is, 1,250 (=125×10) pieces out of all the weight coefficients represent 240 (=24×10) chips of the spreading codes, and 83 pieces of remaining weight coefficients represent 16 chips of the spreading codes, to represent 256 chips of the spreading codes. Here, with such as 125=19×5+5×6, and 83=13×5+3×6, each group of the coefficients is represented as 5 samples/chip, or 6 samples/chip.

As described above, if the number corresponding to the number of samples per one chip is 5 or 6, how 5 samples/chip or 6 samples/chip are arranged does not particularly matter. The above description is only an example and not limited.

As described above, multimode wireless communication apparatus 100 according to the second embodiment allows the delay part for detecting synchronization timing to be shared among plural wireless communication systems, thereby contracting the circuit scale of multimode wireless communication apparatus 100 along with reducing the power consumption.

Third Exemplary Embodiment

Figure 12:
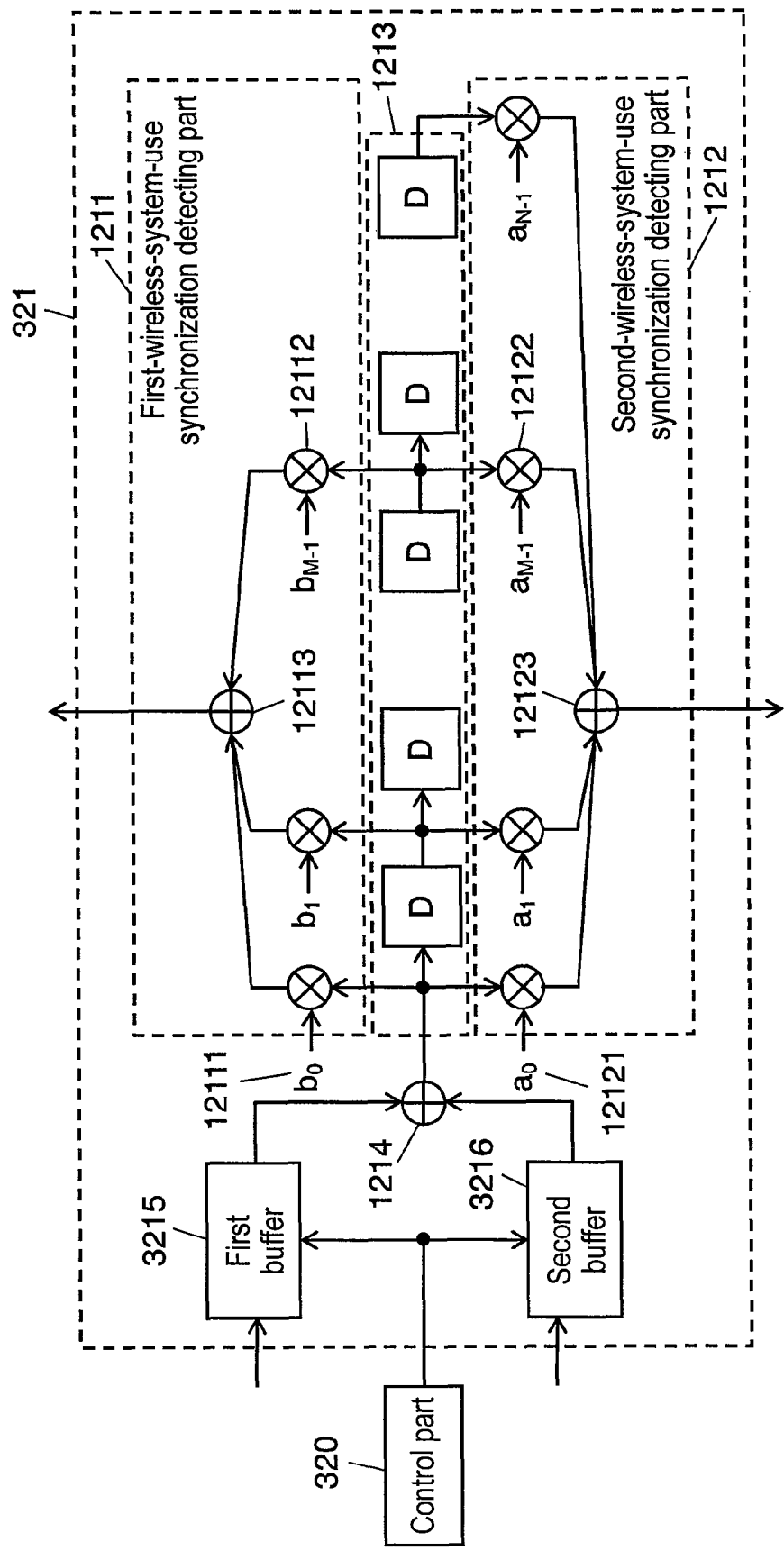
FIG. 12 is a block diagram illustrating makeup of a multimode wireless communication apparatus according to the third exemplary embodiment of the present invention.

FIG. 12 is a block diagram illustrating makeup of synchronization detecting part 321 of multimode wireless communication apparatus 100 according to the third embodiment of the present invention.

Synchronization detecting part 321 in FIG. 12 is different from synchronization detecting part 121 in FIG. 2 in that part 321 has first buffer 3215 as the first converting part and second buffer 3216 as the second converting part, instead of first rate converting part 1215 as the first converting part and second rate converting part 1216 as the second converting part, in FIG. 2, and in that part 321 further has control part 320 directing output to the first and second buffers.

Control part 320 outputs a control signal to first buffer 3215 and second buffer 3216 so that digital signals stored in first buffer 3215 and second buffer 3216 will be output when detecting synchronization timing becomes necessary.

First buffer 3215 outputs the digital signals stored until detecting of synchronization timing completes, on the basis of a control signal entered from control part 320, and also stores the digital signals entered from first A/D part 112 (not shown in FIG. 12). Second buffer 3216 outputs the digital signals stored until detecting of synchronization timing completes, on the basis of the control signal entered from control part 320, and also stores the digital signals entered from second A/D part 113 (not shown in FIG. 12).

Figure 13:
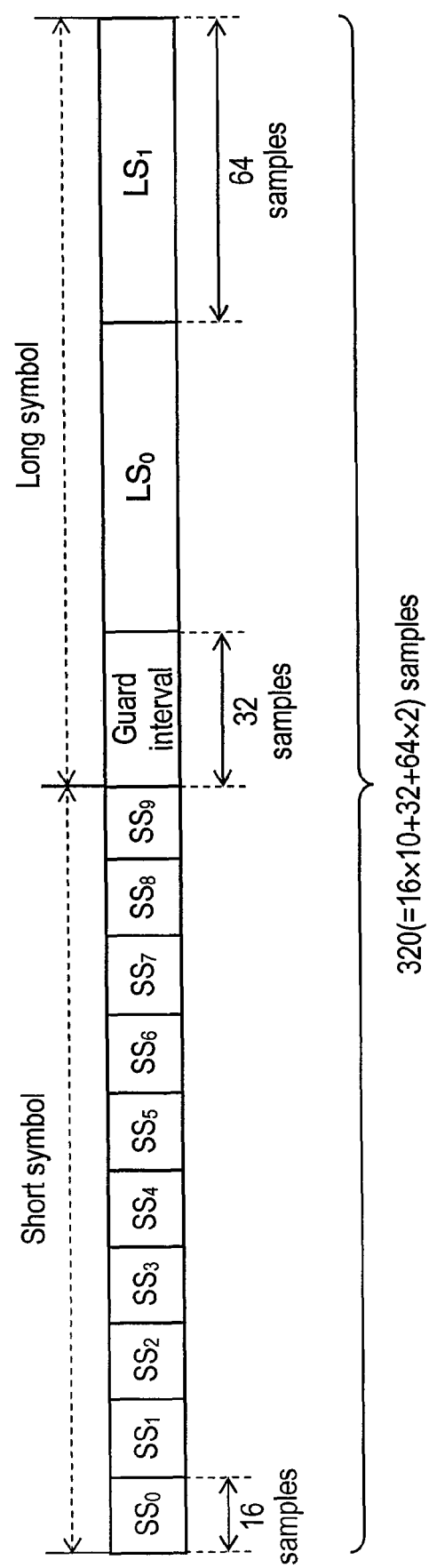
FIG. 13 illustrates makeup of a preamble signal in the multimode wireless communication apparatus according to the third exemplary embodiment of the present invention.

In the third embodiment, first buffer 3215 and second buffer 3216 are assumed to operate with the same timing due to the common clock. In the same way as in the first embodiment, the first wireless system is assumed to use IEEE 802.11a; and the second, W-CDMA. In this case, the preamble signal in IEEE 802.11a is composed of 10 pieces of short symbols ($SS_0, \ldots, SS_9$=16×10 samples), the guard interval between long symbols, and two long symbols ($LS_0$, $LS_1$=64×2 samples), as shown in FIG. 13. The number of delay parts 1213 required for detecting synchronization timing is determined by which symbol is used in the preamble signal for detecting synchronization. Although the whole preamble signal (320 samples) can be used as in the first or second embodiment, only one long symbol in the preamble signal can be used, where 64 pieces of delay parts 1213 are required.

Meanwhile, the length (timewise length of a repeated code pattern) of the spreading code in W-CDMA is 256, and thus the number of delay parts 1213 required for detecting synchronization timing is 256. In the third embodiment, the number of delay elements of delay part 1213 required for detecting synchronization timing is equal to the larger one out of those required in the first and second wireless systems, and thus synchronization detecting part 321 results in being composed of delay part 1213 including 256 pieces of delay elements; multiplying part 12112 including weight coefficient 12111 with 64 elements and 64 pieces of multipliers; and multiplying part 12122 including weight coefficient 12121 with 256 elements and 256 pieces of multipliers.

That is, in multimode wireless communication apparatus 100 according to the third embodiment, first buffer 3215 as the first converting part and second buffer 3216 as the second converting part are buffers for accumulating the digital signals, and output the digital signals accumulated with their timing adjusted according to the number of delay parts 1213.

The sampling rate in IEEE 802.11a is 20 M samples/second, and the chip rate in W-CDMA is 3.84 M chips/second. Accordingly, if first buffer 3215 and second buffer 3216 output the digital signals stored in each buffer at the same timing, the digital signals output from second buffer 3216 have a smaller number of samples (chips) not oversampled than those output from first buffer 3215. Control part 320 thus controls second buffer 3216 so that the digital signals output from second buffer 3216 will be in a burst way.

For example, control is possible where output is stopped for a certain period until 256 chips of the digital signals are stored in second buffer 3216 after 256 (same as the number of delay elements of delay part 1213) chips of the digital signals are continuously output. In this case, while 256 chips in W-CDMA are accumulated in second buffer 3216 in 0.0000667 ($\approx$256/3.84 M) seconds, 1,333 ($\approx$20 M×256/3.84 M) samples in IEEE 802.11a are input into first buffer 3215.

Figure 14:
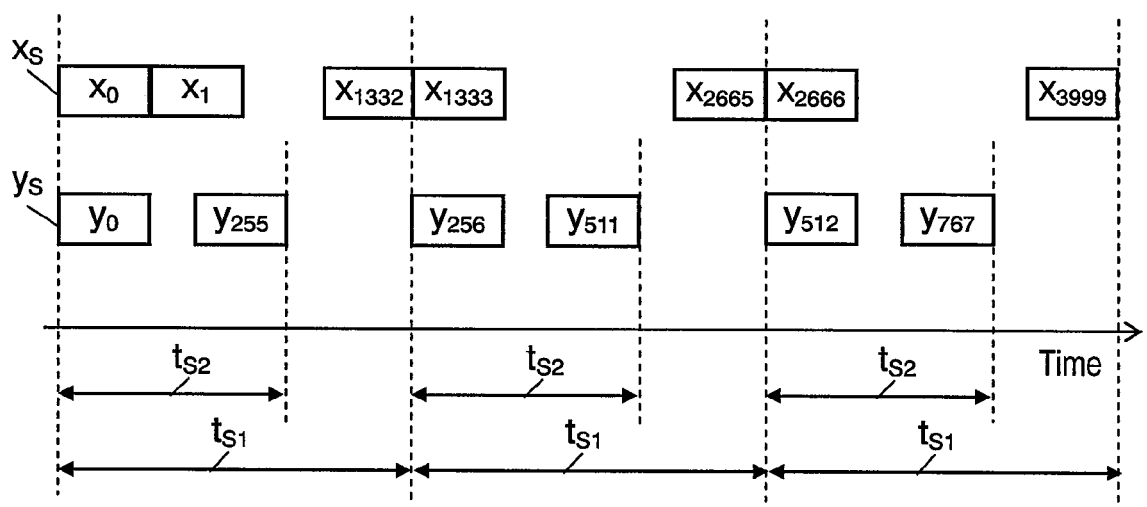
FIG. 14 illustrates an output signal supplied to the delay part of the multimode wireless communication apparatus according to the third exemplary embodiment of the present invention.

A description is made for the above process, using the related drawings. FIG. 14 illustrates output signals to the delay part of the multimode wireless communication apparatus according to the third embodiment of the present invention, where the horizontal axis indicates elapsed time in the right direction. The upper part of FIG. 14 shows signal xs output from first buffer 3215; and the lower, signal ys output from second buffer 3216. As shown in the figure, control is performed where continuous 256 chips of signals ys are output from second buffer 3216 in a burst way at intervals of 1333, 1333, 1334 samples at which $x_0$, $x_{1333}$, $x_{2666}$, $x_{4000}$, . . . are output from first buffer 3215. In other words, burst output $t_{S2}$ of the output from second buffer 3216 is repeated at every burst output $t_{S1}$ of the output from first buffer 3215.

In the above-described example, distribution is made as 4000=1333+1333+1334, considering that time equivalent to 256 chips is 1 cycle for 3 periods because (20 M×256/3.84 M)×3=4000, but the way of distribution is not limited to this one.

Meanwhile, when second-wireless-system-use synchronization detecting part 1212 performs correlation operation for the digital signals output in a burst way, if synchronization timing falls at the vicinity of both ends (i.e. the beginning and ending) of 256 chips output in a burst way, accurately detecting synchronization timing is difficult. The reason is that the averaging process performed for correlation over a certain section is highly likely to be interrupted at the vicinity of both ends of the burst output.

Figure 15:
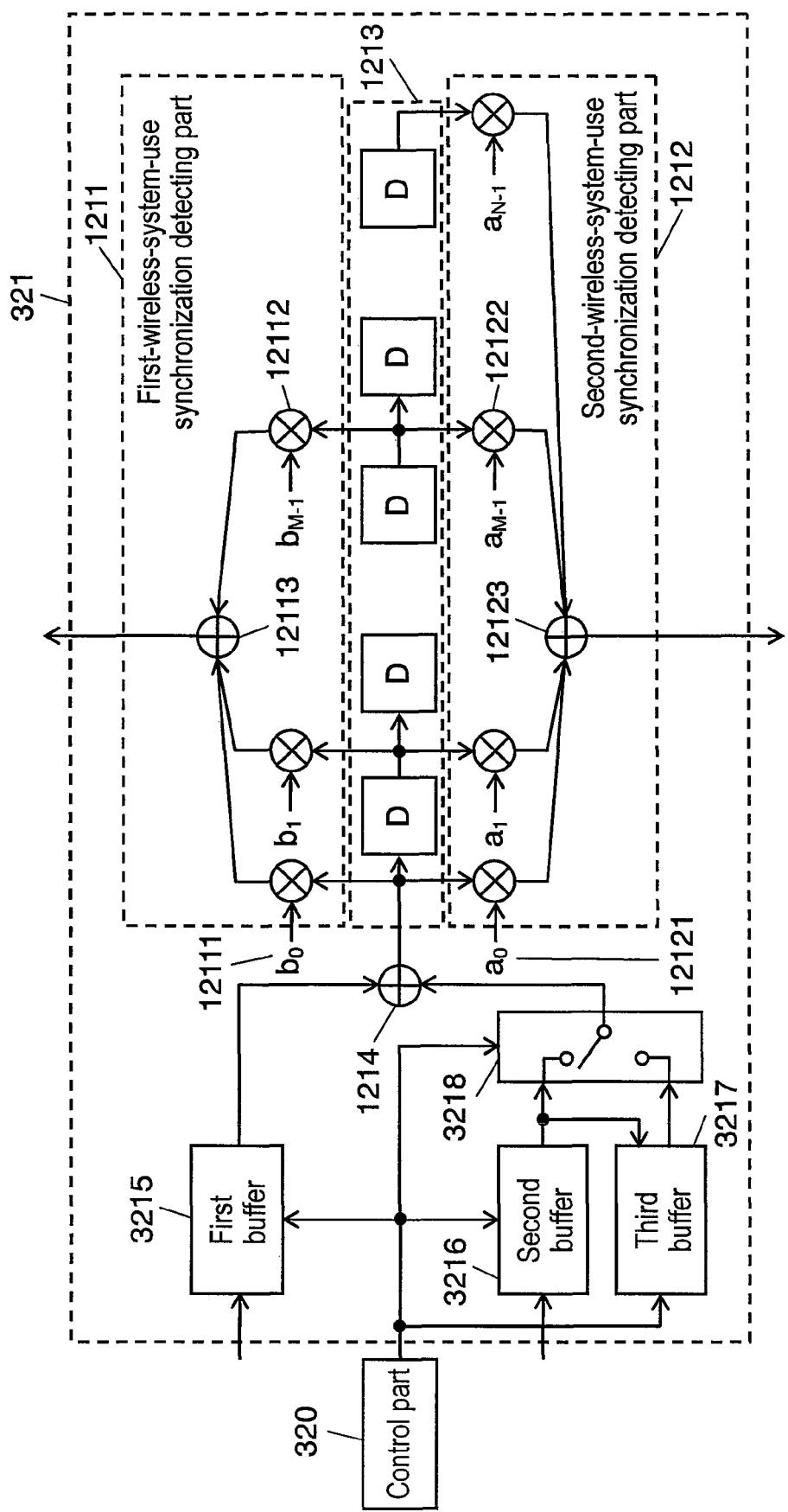
FIG. 15 is a block diagram illustrating another makeup of the multimode wireless communication apparatus according to the third exemplary embodiment of the present invention.

Consequently, as shown in FIG. 15, in order to save a replica of the digital signal output from second buffer 3216, third buffer 3217 as a replica accumulating part; and switch 3218 for switching the output from second buffer 3216 and third buffer 3217 to adding part 1214 are provided, and the replica accumulated is output from third buffer 3217 before outputting next 256 chips of the digital signals after 256 chips are output from second buffer 3216 at the current time in a burst way. Such makeup allows accurate detection of synchronization timing.

Figure 16:
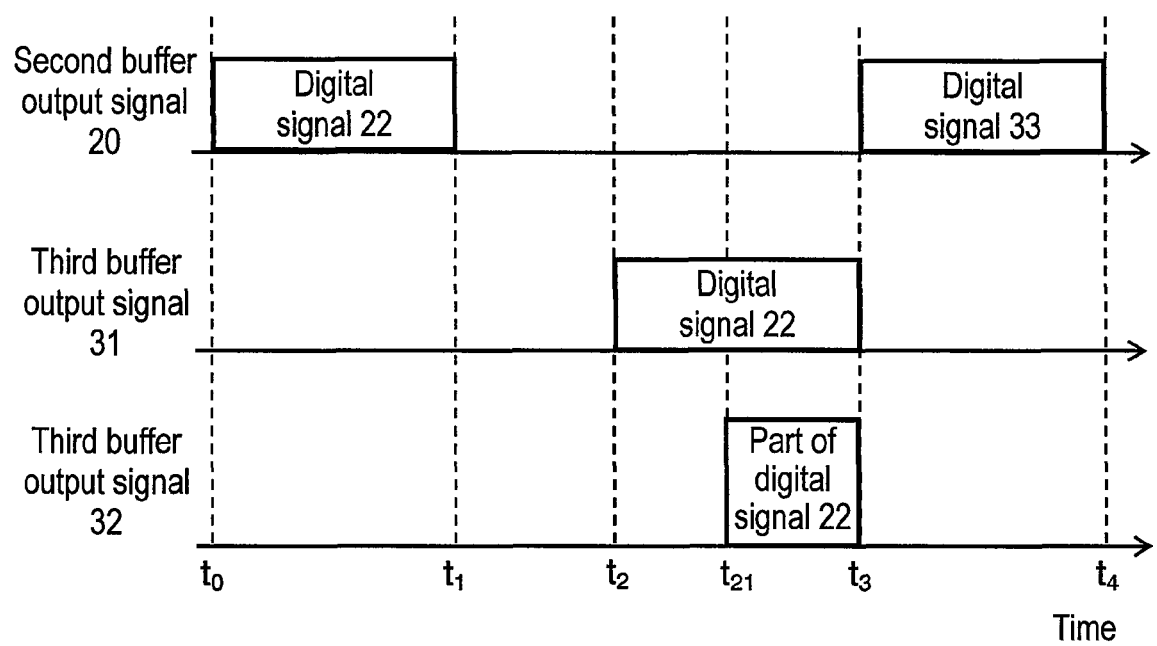
FIG. 16 illustrates the circumstances of switching of the output to the delay part of the multimode wireless communication apparatus according to the third embodiment of the present invention.

FIG. 16 illustrates timing at this moment of switching the output to delay part 1213 through adding part 1214, by operating switch 3218 by control part 320, schematically indicating circumstances in which control part 320 controls switch 3218 to switch the output to adding part 1214.

In FIG. 16, the horizontal axis indicates elapsed time in the right direction. The upper part shows circumstances of output signal 20 from second buffer 3216; and the middle and lower parts, output signals 31 and 32 from third buffer 3217, respectively.

First, control part 320 makes second buffer 3216 output digital signal 22 and controls switch 3218 so that digital signal 22 will be supplied to adding part 1214 during time $t_0$ to $t_1$. Simultaneously, control part 320 controls third buffer 3217 so that digital signal 22 will be stored in third buffer 3217 as well.

Next, control part 320 does not especially perform concrete control during time $t_1$ to $t_2$, when the digital signal is not output from second buffer 3216.

Next, control part 320 makes third buffer 3217 output a replica of digital signal 22 at time point $t_2$, prior to $t_3$, when $t_3$ at which digital signal 33 is output from second buffer 3216 approaches. Then, during time $t_2$ to $t_3$, while the replica of digital signal 22 is being output from third buffer 3217, control part 320 controls switch 3218 so that the replica of digital signal 22 will be output to adding part 1214.

Next, during time $t_3$ to $t_4$, while digital signal 33 is being output from second buffer 3216, control part 320 makes second buffer 3216 output digital signal 33 and controls switch 3218 so that digital signal 33 will be supplied to adding part 1214. Simultaneously, control part 320 controls third buffer 3217 so that digital signal 33 will be stored in third buffer 3217 as well. By repeating this series of operation, the digital signal output in a burst way at a certain time point, continuously with that output in a burst way immediately before, is to be supplied to delay part 1213 through adding part 1214.

Here, a replica accumulated in third buffer 3217 does not need to be composed of all the 256 chips as described above, but of only a data amount with which a timing signal for synchronization at the vicinity of both ends of the digital signal output from second buffer 3216 can be detected. For example, as shown in the lower part of FIG. 16, control part 320 may make output signal 32 from the third buffer output a part of digital signal 22 from third buffer 3217 to adding part 1214, at $t_{21}$, prior to time point $t_3$ and additionally after time point $t_2$. With such operation, accurate synchronization timing is available without accumulating all the 256 chips as the replica.

Here, in the above-described two cases, time period during which signal output to adding part 1214 continues corresponds to time $t_2$ to $t_4$ for output signal 31 from the third buffer shown in the middle part of FIG. 16; and time $t_{21}$ to $t_4$ for output signal 32 from the third buffer shown in the lower part.

Further, the function of third buffer 3217 can be incorporated in second buffer 3216 to output the replica of digital signal 22 and digital signal 33 continuously.

As described above, multimode wireless communication apparatus 100 of the third embodiment further includes third buffer 3217 as the replica accumulating part that accumulates the digital signals same as all of those accumulated in second buffer 3216 as the second converting part, or part of those from an end, and is characterized in that the replica accumulating part completes outputting of digital signals to adding part 1214 previously accumulated before the second converting part starts outputting the digital signals. Thus, delay part 1213 can be shared among plural wireless communication systems, thereby reducing the size and power consumption of multimode wireless communication apparatus 100. Multimode wireless communication apparatus 100 according to the third embodiment can detect synchronization timing at a low sampling frequency only when necessary and with both ends of the sampled receiving signal corrected, thereby allowing highly accurate detection of synchronization timing.

In this embodiment, the first and second wireless systems are assumed to use IEEE 802.11a and W-CDMA, but not limited to.

As described above, according to the present invention, the delay part for detecting synchronization timing can be shared among plural wireless communication systems, thereby reducing the circuit scale of multimode wireless communication apparatus 100.

Multimode wireless communication apparatus 100 according to the third embodiment is characterized in that the first and second converting parts are buffers for accumulating receiving signals and output the digital signals accumulated with their timing adjusted according to the number of delay parts 1213. Delay part 1213 thus can be shared among plural wireless communication systems, and synchronization timing can be detected at the low sampling frequency only when necessary. Consequently, multimode wireless communication apparatus 100 in the third embodiment can detect synchronization timing at a lower sampling frequency than that in the first embodiment, thereby further reducing the power consumption.

Fourth Exemplary Embodiment

Figure 17:
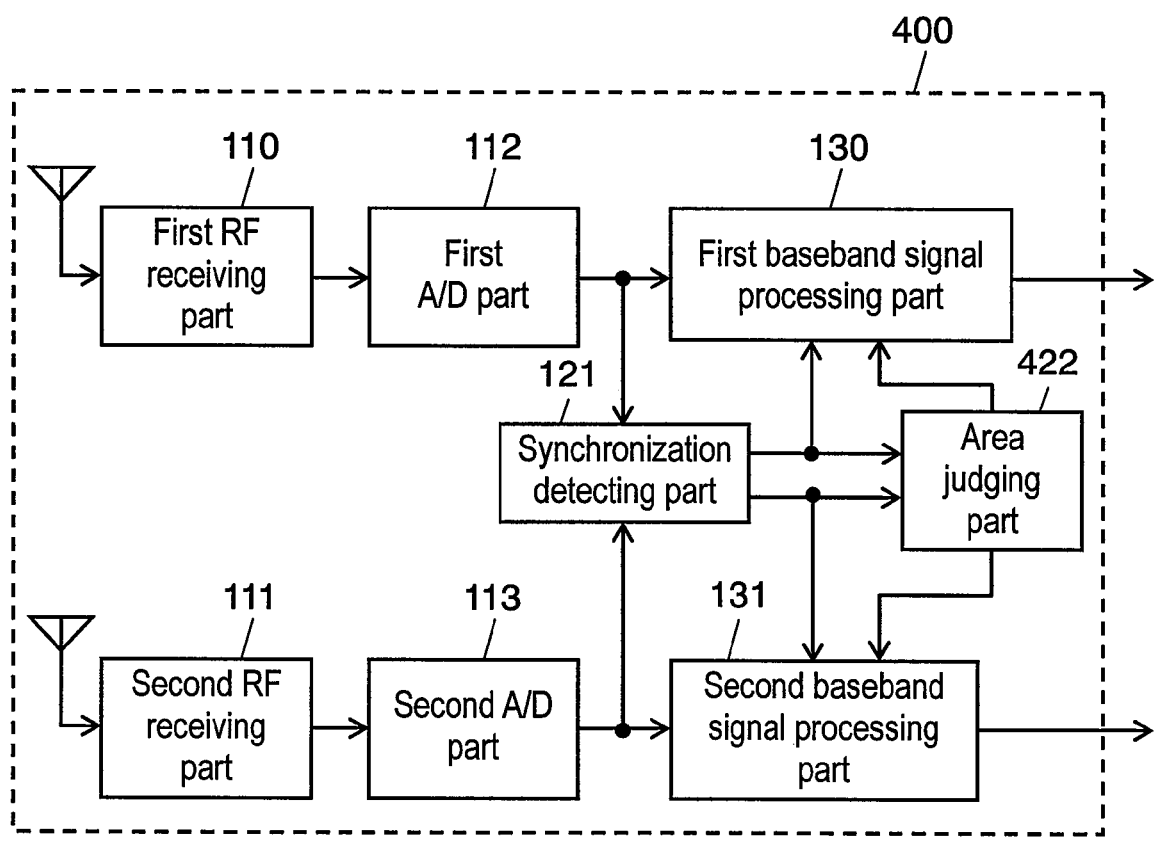
FIG. 17 is a block diagram illustrating a multimode wireless communication apparatus according to the fourth exemplary embodiment of the present invention.

FIG. 17 is a block diagram illustrating makeup of multimode wireless communication apparatus 400 according to the fourth exemplary embodiment of the present invention. As shown in FIG. 17, multimode wireless communication apparatus 400 of the fourth embodiment further includes area judging part 422 in addition to the makeup of multimode wireless communication apparatus 100 of the first embodiment.

Area judging part 422 judges that the communication apparatus is within a communication service area if the peak value of the results of correlation operation entered from synchronization detecting part 121 exceeds a given threshold; and out of the communication service area, otherwise. Further, area judging part 422 outputs a signal for turning on/off of the power, to first baseband signal processing part 130 and second baseband signal processing part 131 on the basis of the judgement result for the first and second wireless systems.

Figure 18:
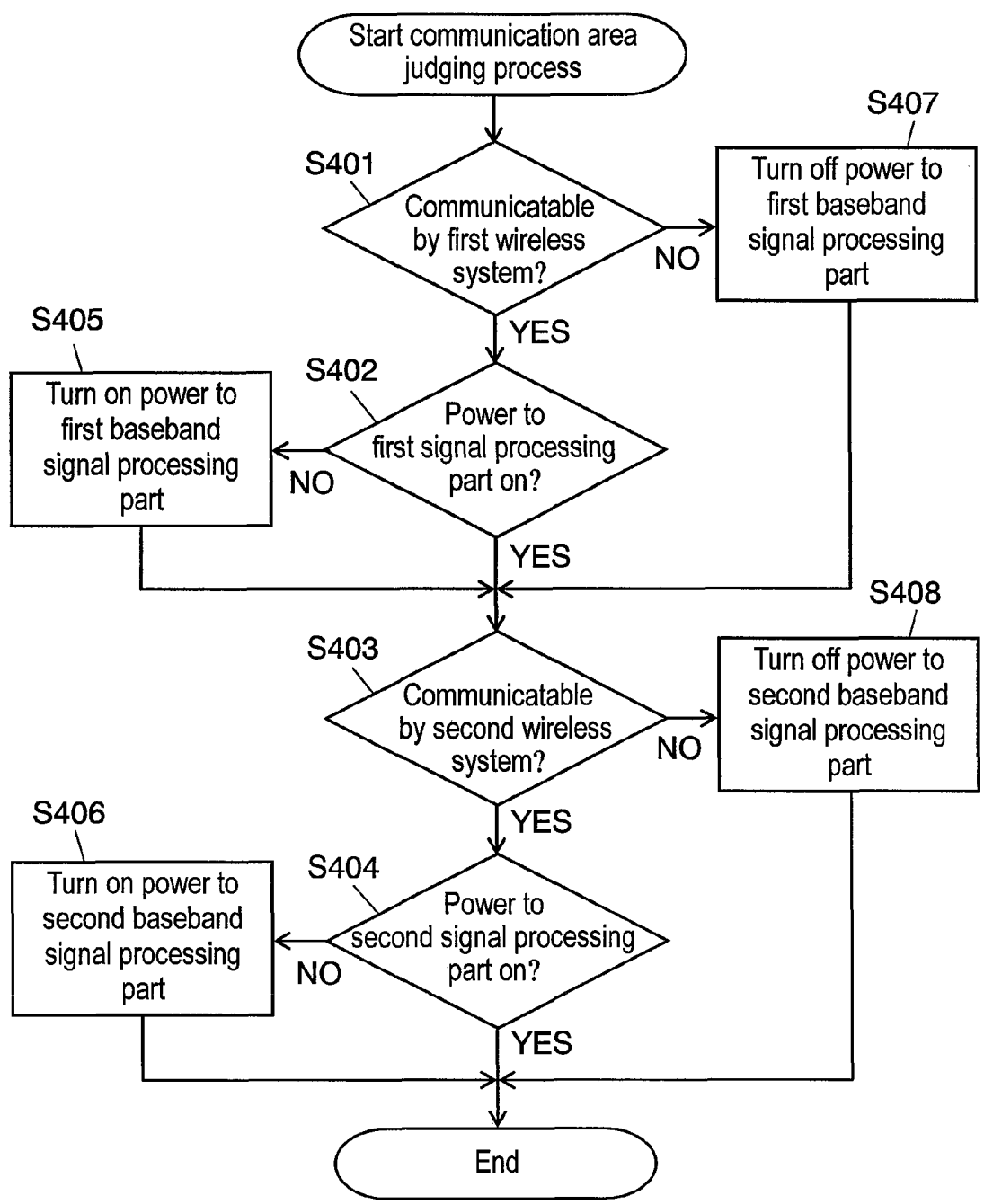
FIG. 18 is a flowchart illustrating the operation of the communication area judging process of the multimode wireless communication apparatus according to the fourth embodiment of the present invention.

FIG. 18 is a flowchart illustrating the operation of communication area judging process of multimode wireless communication apparatus 400 according to the fourth embodiment. The operation of multimode wireless communication apparatus 400 shown in FIG. 17 is described using the flowchart of FIG. 18.

First, area judging part 422 judges whether or not the communication apparatus is within an area communicatable by the first wireless system on the basis of the result of correlation operation by synchronization detecting part 1211 (step S401). If judged as out of the communication service area ("No" in S401), namely if the first wireless system is not available for communication, area judging part 422 turns off the power to first baseband signal processing part 130 (step S407), and then the process proceeds to step S403.

Meanwhile, if judged as within the communication service area ("Yes" in S401), namely if the first wireless system is available for communication, area judging part 422 checks the state of the power to first baseband signal processing part 130 (step S402). Then, if the power to first baseband signal processing part 130 is on ("Yes" in S402), the process proceeds to step S403. If off ("No" in S402), however, area judging part 422 turns on the power to first baseband signal processing part 130 (step S405), and then the process proceeds to step S403.

Next, area judging part 422 judges whether or not the communication apparatus is within the area communicatable by the second wireless system on the basis of the result of correlation operation by synchronization detecting part 1212 (step S403). If judged as out of the communication service area ("No" in S403), namely if the second wireless system is not available for communication, area judging part 422 turns off the power to second baseband signal processing part 131 (step S408), and then completes the communication area judging process.

Meanwhile, if judged as within the communication service area ("Yes" in S403), namely if the second wireless system is available for communication, area judging part 422 checks the state of the power to second baseband signal processing part 131 (step S404). Then, if the power to second baseband signal processing part 131 is on ("Yes" in S404), part 422 completes the communication area judging process. If off ("No" in S404), however, part 422 turns on the power to second baseband signal processing part 131 (step S406) and then completes the communication area judging process.

Here, the communication area judging process does not need to be performed for the first wireless system first, but can be performed for the second one first. In addition, the process does not need to use threshold judgement for the peak among correlation operation results, but may use any means as long as it uses correlation operation results, such as the difference between the peak among correlation operation results and the noise level.

As described above, multimode wireless communication apparatus 400 according to the embodiment includes first baseband signal processing part 130 as the first signal processing part that demodulates the digital signal from first A/D part 112, in accordance with synchronization timing supplied from first-wireless-system-use synchronization detecting part 1211 as the first synchronization detecting part; second baseband signal processing part 131 as a second signal processing part that demodulates the digital signal from second A/D part 113, in accordance with synchronization timing supplied from second-wireless-system-use synchronization detecting part 1212 as the second synchronization detecting part; and area judging part 422, where part 422 judges the possibility of communication by a wireless system using correlation operation results supplied from synchronization detecting part 121. If area judging part 422 judges as wireless communication impossible, part 422 turns off the power to the first or second signal processing part that demodulates the digital signal in the wireless communication method that has been judged as wireless communication being impossible. In this way, only the baseband signal processing part supporting the wireless system communicatable is operated, and thus multimode wireless communication apparatus 400 according to the embodiment can further reduce the power consumption.

Fifth Exemplary Embodiment

Figure 19:
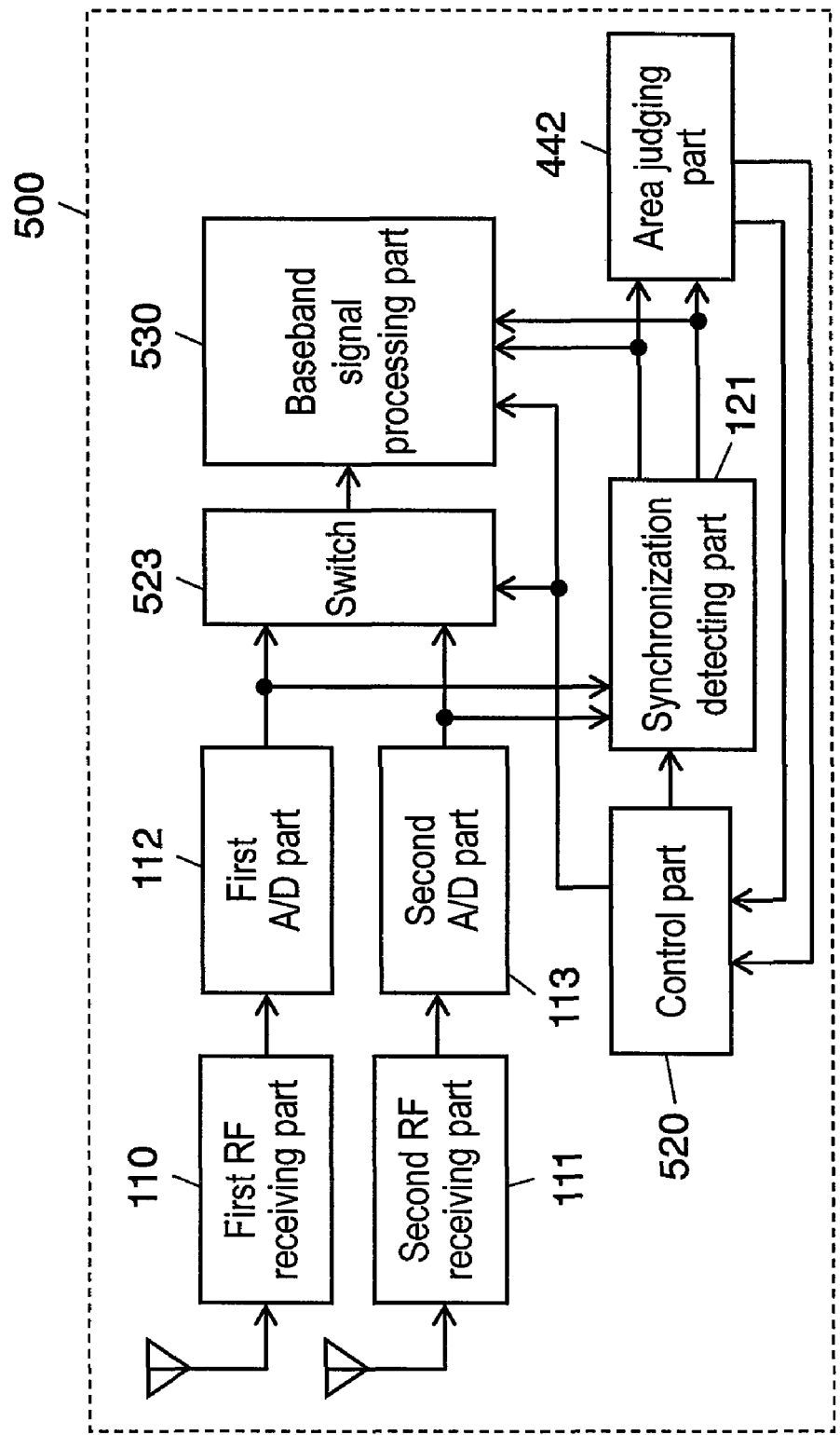
FIG. 19 is a block diagram illustrating makeup of a multimode wireless communication apparatus according to the fifth exemplary embodiment of the present invention.

FIG. 19 is a block diagram illustrating makeup of multimode wireless communication apparatus 500 according to the fifth embodiment of the present invention. Multimode wireless communication apparatus 500 in FIG. 19 is different from multimode wireless communication apparatus 400 according to the fourth embodiment, shown in FIG. 17 in that apparatus 500 includes baseband signal processing part 530 as a software signal processing part, instead of first baseband signal processing part 130 and second baseband signal processing part 131, and further includes switch 523 and control part 520. Another difference from the fourth embodiment is that judgement results from area judging part 442 are supplied to control part 520.

Baseband signal processing part 530 implements a general-purpose signal process by hardware and a function specific to each communication method, by software. In the fifth embodiment, baseband signal processing part 530 can support IEEE 802.11a and W-CDMA, where control part 520 switches between the function of first baseband signal processing part 130 of multimode wireless communication apparatus 100 according to the first embodiment shown in FIG. 1, and that of second baseband signal processing part 131.

Switch 523 switches the input of digital signals from first A/D part 112 and second A/D part 113, and is controlled by control part 520. More specifically, control part 520 sets switch 523 so that an output signal supplied from first A/D part 112 will be input to baseband signal processing part 530, if baseband signal processing part 530 has the function of first baseband signal processing part 130; and part 520 switches so that an output signal supplied from second A/D part 113 will be input to baseband signal processing part 530, if baseband signal processing part 530 has the function of second baseband signal processing part 131.

Control part 520 controls switch 523 and baseband signal processing part 530 on the basis of the judgement result by area judging part 442, and if the result indicates that communication is possible only by the first wireless system, part 520 directs baseband signal processing part 530 so that part 530 will support the first wireless system.

If the judgement result indicates that communication is possible only by the second wireless system, control part 520 directs baseband signal processing part 530 so that baseband signal processing part 530 will support the second wireless system. If the judgement result indicates that communication is possible or impossible by both wireless systems, control part 520 determines so that baseband signal processing part 530 will support the first or second wireless system, according to predetermined priority.

If communication is possible or impossible by both wireless systems, judgement can be made by comparing the results of correlation operation performed by first-wireless-system-use synchronization detecting part 1211 and that by second-wireless-system-use synchronization detecting part 1212. Such methods include comparing the peak values between the respective results of correlation operation, and comparing the differences between the peaks among correlation operation results and the noise level.

If communication is impossible by both wireless systems, decision can be made on conditions such as larger cover area or higher reception sensitivity out of the first and second wireless systems. If communication is possible by both wireless systems, less expensive communication charge or lower power consumption can be such a condition. Alternatively, a user of the multimode wireless communication apparatus may select a wireless system.

Figure 20:
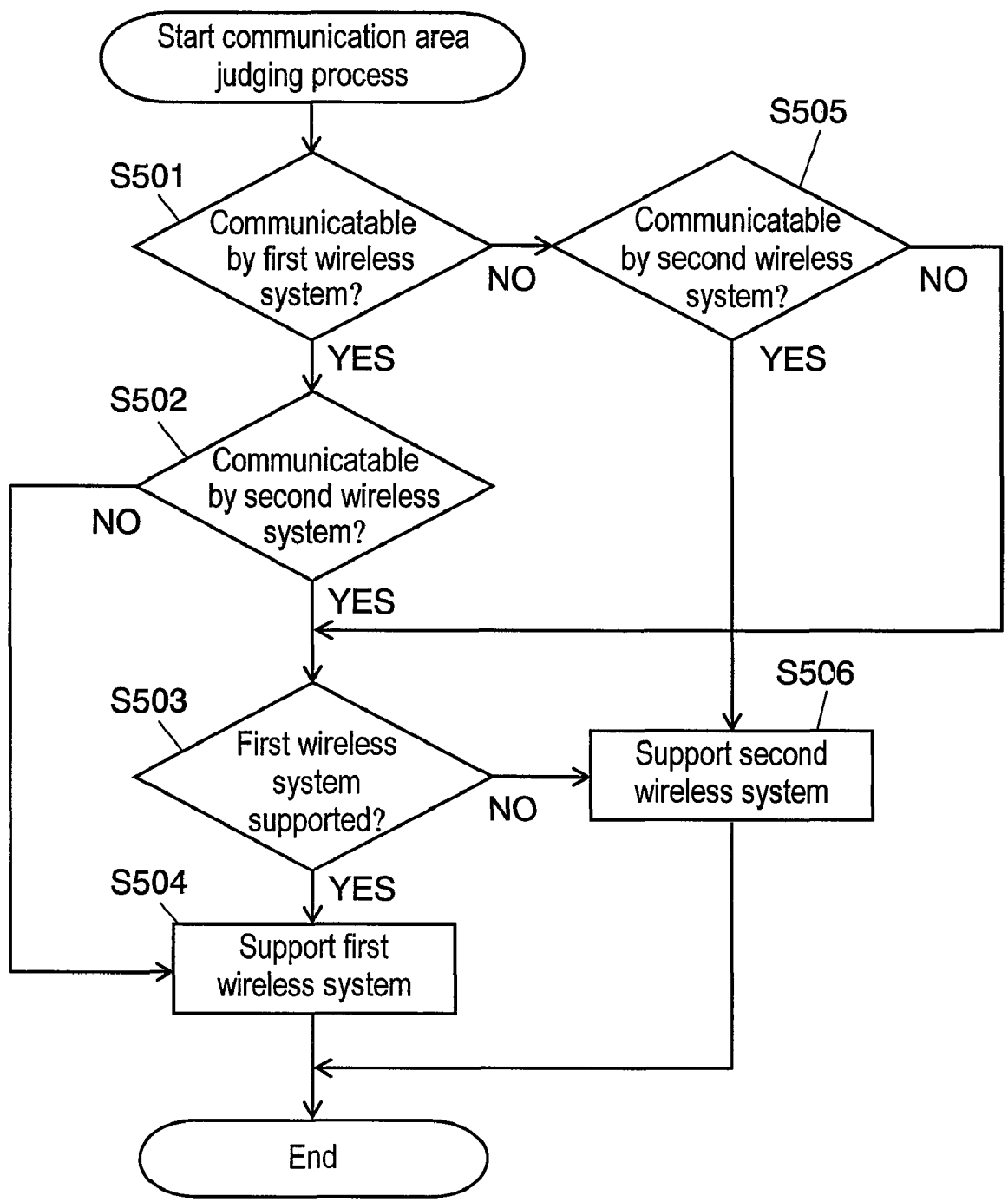
FIG. 20 is a flowchart illustrating the operation of the communication area judging process of the multimode wireless communication apparatus according to the fifth embodiment of the present invention.
Figure 21:
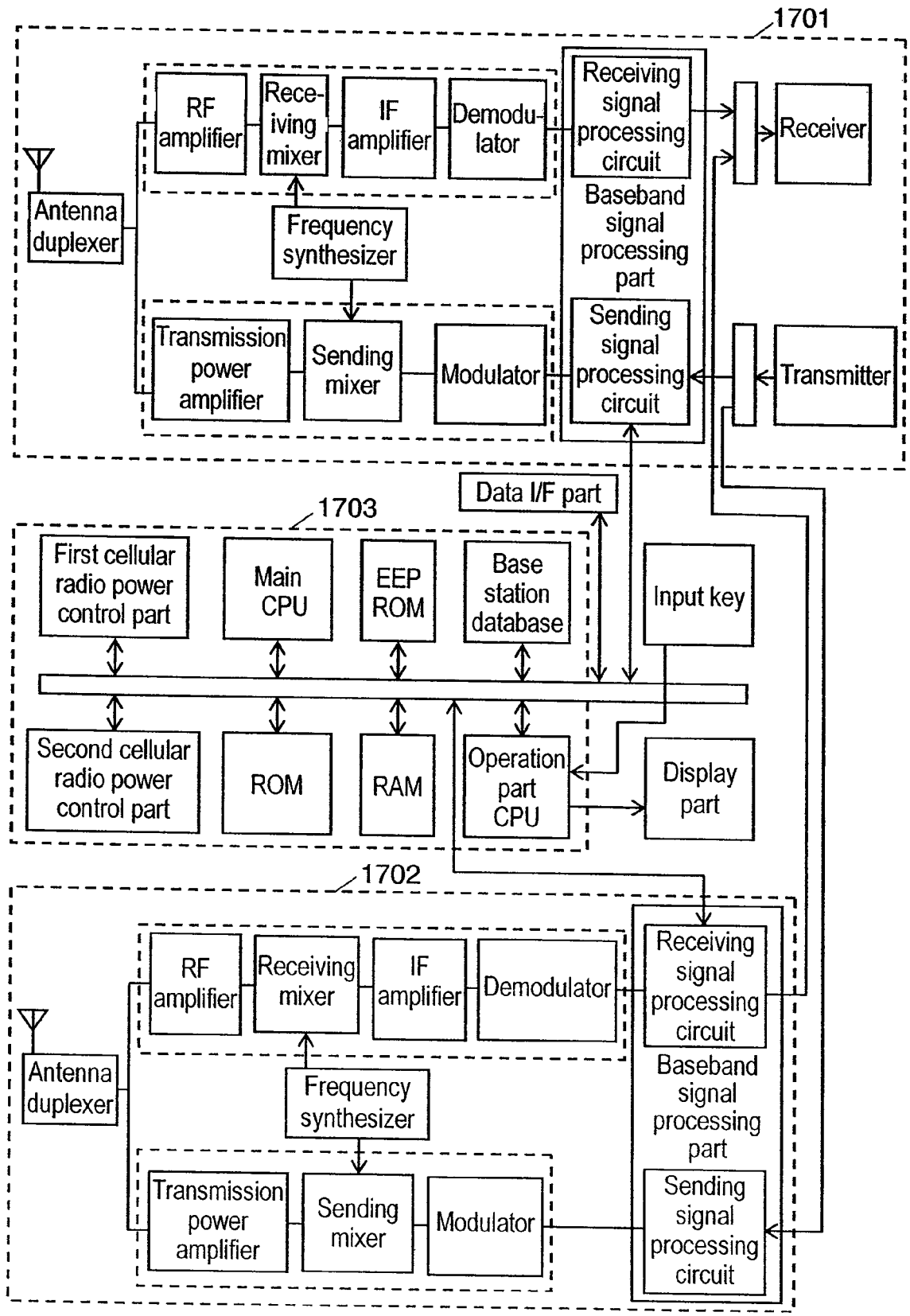
FIG. 21 is a block diagram illustrating makeup of a conventional multimode wireless terminal

FIG. 20 is a flowchart illustrating the operation of the communication area judging process of the multimode wireless communication apparatus according to the embodiment.

The operation of multimode wireless communication apparatus 500 shown in FIG. 19 is described using the flowchart of FIG. 20.

First, area judging part 442 judges whether or not the communication apparatus is within an area communicatable by the first wireless system on the basis of the result of correlation operation by synchronization detecting part 1211 (step S501).

If judged as out of a communication service area ("No" in S501), area judging part 442 judges whether or not the communication apparatus is within an area communicatable by the second wireless system on the basis of the result of correlation operation by synchronization detecting part 1212 (step S505). If judged as out of the communication service area ("No" in S505), the process proceeds to step S503. Meanwhile, if judged as within the communication service area ("Yes" in S505), namely if only the second wireless system is available for communication, baseband signal processing part 530 begins to support the second wireless system (step S506), and then completes the communication area judging process.

Meanwhile, in step S501, if judged as within the communication service area through the first wireless system ("Yes" in S501), judgement is as well made whether or not the communication apparatus is within the area communicatable by the second wireless system on the basis of the result of correlation operation by synchronization detecting part 1212 (step S502). If judged as within the communication service area ("Yes" in S502), the process proceeds to step S503. Meanwhile, if judged as out of the communication service area ("No" in S502), namely if only the first wireless system is within the communicatable area, baseband signal processing part 530 begins to support the first wireless system (step S504), and then completes the communication area judging process.

The current state is that communication is possible or impossible by both the first and second wireless systems, and thus control part 520 determines if the first wireless system is to be supported, according to given priority (step S503). If determined so ("Yes" in S503), baseband signal processing part 530 begins to support the first wireless system (step S504), and then completes the communication area judging process. Meanwhile, if determined otherwise ("No" in S503), baseband signal processing part 530 begins to support the second wireless system (step S506), and then completes the communication area judging process.

Here, the communication area judging process does not need to be performed for the first wireless system first, but can be performed for the second one first.

If the area determining process of the fifth embodiment is applied to multimode wireless communication apparatus 400 in FIG. 17 of the fourth embodiment, the following control is possible. That is, in S506, the power to first baseband signal processing part 130 in FIG. 17 is turned off instead of assigning baseband signal processing part 530 to support the second wireless system in FIG. 19; and in S504 as well, the power to second baseband signal processing part 131 is turned off instead of assigning baseband signal processing part 530 to support the first wireless system.

Synchronization detecting part 121 can detect synchronization timing for three or more wireless systems, and thus as a result that synchronization detecting part 121 performs correlation operation using a weight coefficient used for detecting synchronization timing for a wireless system other than the first or second wireless system, area judging part 442 can judge the communication service area for plural wireless systems. Making baseband signal processing part 530 support three or more wireless systems enables multimode wireless communication apparatus 500 according to the present invention to support three or more wireless systems.

As described above, multimode wireless communication apparatus 500 according to the embodiment includes baseband signal processing part 530 as a software signal processing part that switches operation including either one of a first signal process that demodulates the digital signal from first A/D part 112 in accordance with synchronization timing from first-wireless-system-used synchronization detecting part 1211 as the first synchronization detecting part; and a second signal process that demodulates the digital signal from second A/D part 113 in accordance with synchronization timing from second-wireless-system-use synchronization detecting part 1212 as the second synchronization detecting part, on a given condition. The software signal processing part is characterized in that it performs either one of the first and second signal processes corresponding to a wireless communication system that has been judged as wireless communication being possible by area judging part 442. Other characteristics include that a signal process by the software signal processing part is determined to either one of the first and second signal processes by comparing the results of correlation operation by the first and second synchronization detecting parts.

Multimode wireless communication apparatus 100 according to the embodiment can thus share the delay part among plural wireless communication systems and does not have plural baseband signal processing parts 530, thereby reducing the circuit scale and power consumption.

INDUSTRIAL APPLICABILITY

As described above, the present invention facilitates downsizing and reducing the power consumption of an apparatus, and thus is useful for a synchronization detecting circuit and a multimode wireless communication apparatus.

The invention claimed is:

1. A synchronization detecting circuit comprising:
    a first converting part that converts a sampling frequency of a receiving signal received by a first wireless communication method and outputs a first digital signal;
    a second converting part that converts a sampling frequency of a receiving signal received by a second wireless communication method and outputs a second digital signal;
    an adding part that combines the first digital signal with the second digital signal;
    a delay part that delays the combined signal output from the adding part;
    a first synchronization detecting part that detects synchronization timing for the receiving signal by the first wireless communication method from the combined signal delayed; and
    a second synchronization detecting part that detects synchronization timing for the receiving signal by the second wireless communication method from the combined signal delayed.

2. The synchronization detecting circuit of claim 1, further comprising:
    a switch that switches input from the first converting part and the second converting part to the adding part,
    wherein synchronization timing is detected by time-division method by controlling the switch when communication is not being performed by the first or second wireless communication method.

3. The synchronization detecting circuit of claim 1,
    wherein the first and the second converting parts accumulate the receiving signal by first and second wireless communication methods, respectively, and adjust timing for the first and second digital signals converted according to the number of the delay parts and output the first and second digital signals, respectively.

4. The synchronization detecting circuit of claim 3, further comprising:
    a replica accumulating part that accumulates a digital signal identical to the whole second digital signal accumulated by the second converting part, or to part of that from an end,
    wherein the replica accumulating part completes outputting of the second digital signal previously accumulated to the adding part immediately before outputting of the second digital signal from the second converting part to the adding part starts.

5. The synchronization detecting circuit of claim 1,
    wherein detecting synchronization timing by the first and second synchronization detecting parts is based on a result of correlation operation between a specific coefficient preliminarily prescribed by the first or second wireless communication method, and the combined signal of the digital signals delayed, according to the sampling frequency.

6. The synchronization detecting circuit of claim 1, further comprising:
    a bit-shifting part that matches the number of bits for operation by the first and second synchronization detecting parts.

7. A multimode wireless communication apparatus comprising:
    the synchronization detecting circuit of claim 1.

8. A multimode wireless communication apparatus comprising:
    the synchronization detecting circuit of claim 5; and
    an area judging part that judges possibility of wireless communication according to the result of correlation operation.

9. The multimode wireless communication apparatus of claim 8, further comprising:
    a first signal processing part that demodulates the first digital signal in accordance with synchronization timing from the first synchronization detecting part; and
    a second signal processing part that demodulates the second digital signal in accordance with synchronization timing from the second synchronization detecting part,
    wherein, when the area judging part judges as wireless communication being impossible, power to the first or second signal processing part that demodulates a digital signal in a wireless communication method judged as wireless communication being impossible is turned off.

10. The multimode wireless communication apparatus of claim 8, further comprising:
    a software signal processing part that switches operation including either one of:
        a first signal process that demodulates the first digital signal in accordance with synchronization timing from the first synchronization detecting part; and
        a second signal process that demodulates the second digital signal in accordance with synchronization timing from the second synchronization detecting part, on a given condition,
    wherein the software signal processing part performs either one of the first and second signal processes corresponding to a wireless communication system judged as wireless communication being possible by the area judging part.

11. The multimode wireless communication apparatus of claim 10, wherein the signal process by the software signal processing part is determined to either one of the first and second signal processes, by comparing a result of correlation operation of the first and second synchronization detecting parts.

* * * * *